US012576443B2

(12) United States Patent
Suzuki et al.

(10) Patent No.: US 12,576,443 B2
(45) Date of Patent: Mar. 17, 2026

(54) METHOD OF MANUFACTURING PRESS-FORMED PRODUCT, APPARATUS FOR TRANSPORTING HEATED WORKPIECE, AND HOT-PRESS MANUFACTURING LINE

(71) Applicant: NIPPON STEEL CORPORATION, Tokyo (JP)

(72) Inventors: Toshiya Suzuki, Tokyo (JP); Naruhiko Nomura, Tokyo (JP); Koichi Hamada, Tokyo (JP); Yujiro Tatsumi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 402 days.

(21) Appl. No.: 18/042,643

(22) PCT Filed: Aug. 23, 2021

(86) PCT No.: PCT/JP2021/030781
§ 371 (c)(1),
(2) Date: Feb. 23, 2023

(87) PCT Pub. No.: WO2022/045057
PCT Pub. Date: Mar. 3, 2022

(65) Prior Publication Data
US 2023/0356283 A1 Nov. 9, 2023

(30) Foreign Application Priority Data
Aug. 28, 2020 (JP) ................................. 2020-145072

(51) Int. Cl.
*B21D 43/10* (2006.01)
*B21D 22/20* (2006.01)
*B25J 15/10* (2006.01)

(52) U.S. Cl.
CPC ......... *B21D 43/105* (2013.01); *B21D 22/208* (2013.01); *B25J 15/106* (2013.01)

(58) Field of Classification Search
CPC .... B21D 22/022; B21D 22/208; B21D 43/10; B21D 43/105; B25J 15/10; B25J 15/106
See application file for complete search history.

(56) References Cited

U.S. PATENT DOCUMENTS

| | | | | |
|---|---|---|---|---|
| 3,139,302 A * | 6/1964 | Orloff | ................... | B65G 47/90 294/902 |
| 8,459,084 B2 * | 6/2013 | Krajewski | .............. | B21D 24/16 148/714 |

(Continued)

FOREIGN PATENT DOCUMENTS

| | | |
|---|---|---|
| GB | 1406121 A | 9/1975 |
| JP | 4673656 B2 | 1/2011 |

(Continued)

OTHER PUBLICATIONS

DE 102017121557A1, Demir et al. Mar. 2019.*

(Continued)

*Primary Examiner* — Edward T Tolan
(74) *Attorney, Agent, or Firm* — Greer, Burns & Crain, Ltd.

(57) ABSTRACT

A method of manufacturing a press-formed product includes: a heating step; a transportation step; and a pressing step. The transportation step includes: using claws of a pair of first arms to support the lower surface, at both ends, of a first heated workpiece and lift the workpiece; using claws of a pair of second arms to support the lower surface, at both ends, of a second heated workpiece and lift the workpiece; transporting the first heated workpiece with the lower surface supported, at both ends, by the claws of the pair of first arms and the second heated workpiece with the lower surface supported, at both ends, by the claws of the pair of (Continued)

second arms, where the first and second heated workpieces overlap each other in the direction normal to the sheet surfaces; driving the pair of first arms to lower the first heated workpiece to a pressing location on a press machine; and driving the pair of second arms to lower the second heated workpiece to a pressing location on the press machine.

11 Claims, 39 Drawing Sheets

(56) References Cited

U.S. PATENT DOCUMENTS

| | | | | |
|---|---|---|---|---|
| 9,233,474 | B2 * | 1/2016 | Xiao | B25J 15/022 |
| 10,035,262 | B2 | 7/2018 | Morey | |
| 11,053,088 | B2 * | 7/2021 | Ochiishi | B65G 61/00 |
| 12,134,118 | B2 * | 11/2024 | Nomura | B21D 43/05 |
| 2010/0101296 | A1 * | 4/2010 | Handing | C21D 9/48 |
| | | | | 72/342.5 |
| 2019/0091748 | A1 * | 3/2019 | Nakazawa | C22C 38/04 |
| 2019/0201961 | A1 * | 7/2019 | Nomura | B21D 43/026 |
| 2022/0152685 | A1 | 5/2022 | Nomura et al. | |

FOREIGN PATENT DOCUMENTS

| | | | |
|---|---|---|---|
| JP | 5814669 | B2 | 10/2015 |
| JP | 5910305 | B2 | 4/2016 |
| JP | 5910306 | B2 | 4/2016 |
| JP | 2019177394 | A | 10/2019 |
| WO | 2020246396 | A1 | 12/2020 |

OTHER PUBLICATIONS

CN 105834268A, An Aug. 2016.*
CN 108421866A, Qian et al. Aug. 2018.*
DE 102011102519A, Schneid Nov. 2012.*
Translation, DE 102011102519A, Schneid Nov. 2012.*

* cited by examiner o   Temperature measurement location

METHOD OF MANUFACTURING PRESS-FORMED PRODUCT, APPARATUS FOR TRANSPORTING HEATED WORKPIECE, AND HOT-PRESS MANUFACTURING LINE

TECHNICAL FIELD

The present invention relates to a method of manufacturing a press-formed product, an apparatus for transporting a workpiece, and a hot-press manufacturing line.

BACKGROUND ART

Techniques are in use that heat material to a predetermined temperature and press the material using a press machine. For example, during hot pressing, material, i.e., steel sheet for hot pressing, is heated to the austenite range (i.e., about 900° C. and higher), and is hot press-formed. Thus, quenching is performed together with the forming process, thereby providing a press-formed product with a strength of the order of 1500 MPa or higher, for example. During typical hot pressing, quenching is performed as the sheet is rapidly cooled by contact heat transfer to the die during press-forming. This means that, to sufficiently produce the effects of quenching, the temperature of the material at the beginning of press-forming, which roughly corresponds to the quenching initiation temperature, must not be lower than a certain temperature. In such cases, this certain temperature at the beginning of press-forming is, for example, 700° C. or higher depending on the material.

Japanese Patent Nos. 5910305 and 5910306 each disclose a hot press-forming method involving positioning a plurality of electrically conductive sheet-shaped workpieces so as to overlap each other, attaching electrodes to the workpieces, and passing electricity through the workpieces to heat the sheet-shaped workpieces. The heated sheet-shaped workpieces are positioned at predetermined pressing locations that are different from the location where they receive electricity. Each of the sheet-shaped workpieces at the pressing locations is press-formed. Heating a plurality of sheet-shaped workpieces by simultaneously passing electricity therethrough improves productivity.

JP 2019-177394 A discloses a hot-pressing method in which a first workpiece and a second workpiece are heated without being positioned to overlap upon each other, are then transported into a space between an upper die part and a lower die part where the second workpiece overlaps the first workpiece, and the upper die part is lowered to press them. Before and after the pressing step, a die part that is separate from the upper die part is lowered to plastically deform the first and second workpieces. This causes the overlapping portions of the first and second workpieces to engage such that they cannot be displaced from each other. The document further discloses a transportation apparatus including an arm for transporting the first workpiece and a holder for transporting the second workpiece.

In the case of the above-described conventional techniques, heat is diffused out of the workpiece during transportation thereof, causing the temperature of the workpiece to decrease. As a result, when the workpiece is being transported into the die of the press machine, the workpiece may not be maintained at a temperature required from the workpiece, potentially leading to insufficient quenching of the press-formed product.

To solve this problem, Japanese Patent No. 5814669 discloses a transportation apparatus for hot pressing, including a manufacturing line for hot pressing where a panel-shaped object is kept in a heated state and transported from one step to another of the line. The transportation apparatus for hot pressing transports the heated object while the object is covered with a temperature-retaining cover. This maintains the object being transported at a temperature required for quenching.

Japanese Patent No. 4673656 discloses a hot press-forming apparatus including a device for heating a metal sheet that is being processed, including a primary heating means using dielectric heating and electrical heating, and a secondary heating means using radiant heat transmission. The secondary heating means using radiant heat transmission is provided on a device for transportation from the primary heating means to the hot press-forming die. Secondary heating using radiant heat transmission achieves uniform heating of the metal sheet, reducing temperature deviation in the metal sheet.

PRIOR ART DOCUMENTS

Patent Documents

Patent Document 1: Japanese Patent No. 5910305
Patent Document 2: Japanese Patent No. 5910306
Patent Document 3: JP 2019-177394 A
Patent Document 4: Japanese Patent No. 5814669
Patent Document 5: Japanese Patent No. 4673656

SUMMARY OF THE INVENTION

Problems to be Solved by the Invention

The inventors noted that, if the material to be hot pressed has a reduced thickness, a temperature drop after heating of the material and during transportation to the press machine may affect the quality of the resulting press-formed product. The inventors investigated how to reduce temperature drop in the material being transported. In the course of the investigation, they found that merely covering the material being transported with a temperature-retaining cover, as with the above-described conventional techniques, may not be enough to sufficiently reduce temperature drop. A secondary heating means may be provided to heat the material during transportation. However, this requires additional equipment including a heat source for the secondary heating means provided on the transportation path. This increases the size of the entire equipment and may, at the same time, lead to increased equipment and/or operation costs.

In view of this, the present application discloses a method of manufacturing a press-formed product, as well as an apparatus for transporting a heated workpiece, where, in hot press-forming, temperature drop in material during the transportation period after heating of the material until beginning of press-forming is reduced in a simple manner.

Means for Solving the Problems

A method of manufacturing a press-formed product according to an embodiment of the present invention includes: a heating step in which at least two sheet-shaped workpieces are simultaneously heated by a heating device; a transportation step in which the at least two heated workpieces heated at the heating step are transported by a transportation apparatus to a press machine; and a pressing step in which the at least two heated workpieces transported to the press machine at the transportation step are processed by the press machine. The transportation step includes: driving a pair of first arms rotatably mounted on a base frame included in the transportation apparatus to cause claws of the pair of first arms to support a lower surface, at both ends, of a first heated workpiece of the at least two heated workpieces and lift the workpiece; driving, using a system separate from that for the pair of first arms, a pair of second arms rotatably mounted on the base frame included in the transportation apparatus to cause claws of the pair of second arms to support a lower surface, at both ends, of a second heated workpiece of the at least two heated workpieces and lift the workpiece; transporting the first heated workpiece with the lower surface supported, at both ends, by the claws of the pair of first arms of the transportation apparatus and the second heated workpiece with the lower surface supported, at both ends, by the claws of the pair of second arms, where the first and second heated workpieces overlap each other in a direction normal to a sheet surface of the first heated workpiece; driving the pair of first arms to lower the first heated workpiece supported by the pair of first arms to a pressing location on the press machine; and driving the pair of second arms using the system separate from that for the pair of first arms to lower the second heated workpiece supported by the pair of second arms to a pressing location on the press machine.

Effects of the Invention

According to the present disclosure, in hot press-forming, temperature drop in material during the transportation period after heating of the material until beginning of press-forming is reduced in a simple manner.

4

Figure 15:
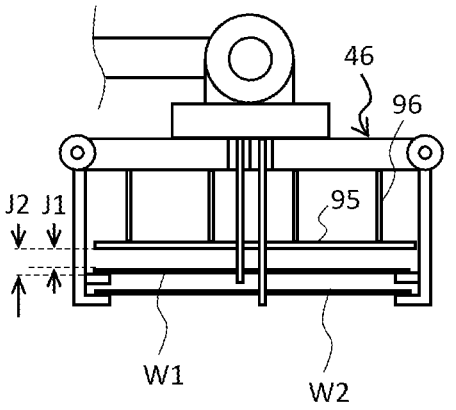
Figure 15:
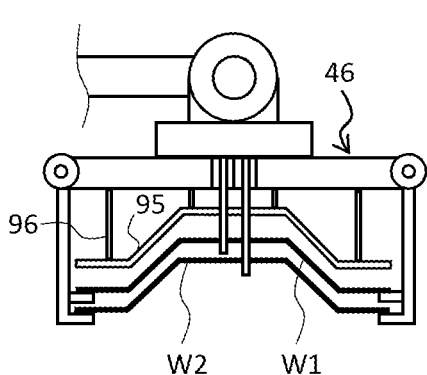

FIG. 15 illustrates yet other implementations with a shield on the transportation apparatus.

Figure 16:
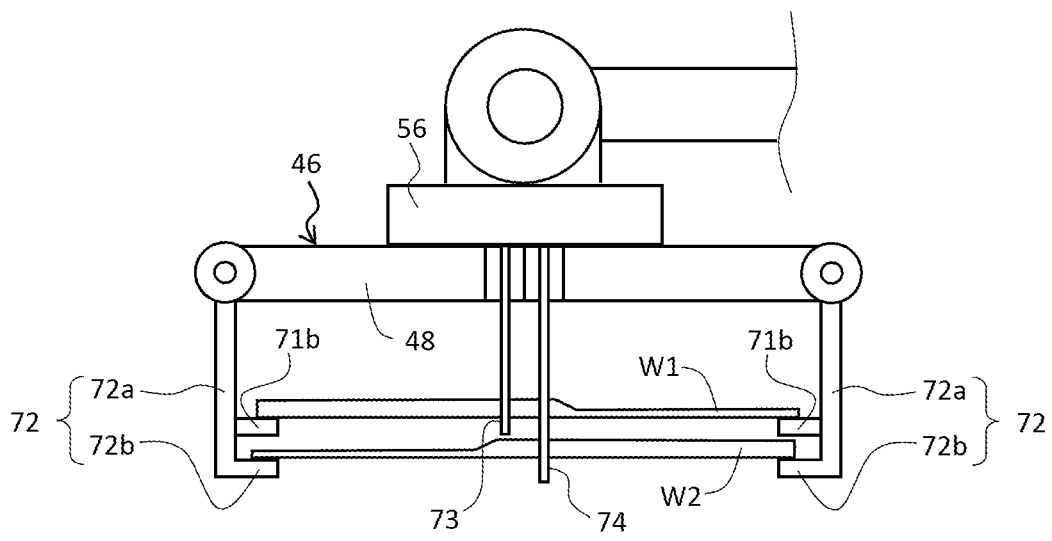

FIG. 16 shows an exemplary transportation apparatus for transporting differential-thickness sheets.

Figure 17:
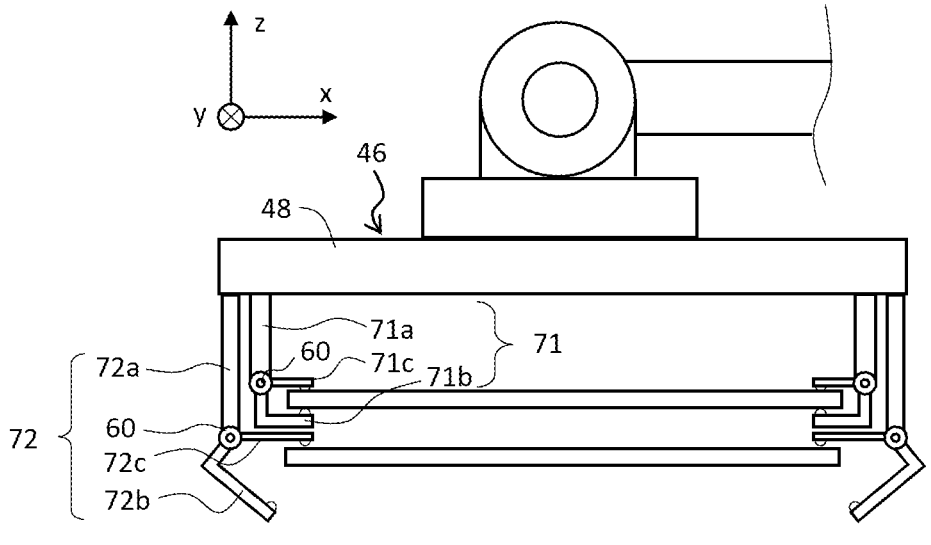

FIG. 17 shows a variation of the first and second arms.

Figure 18:
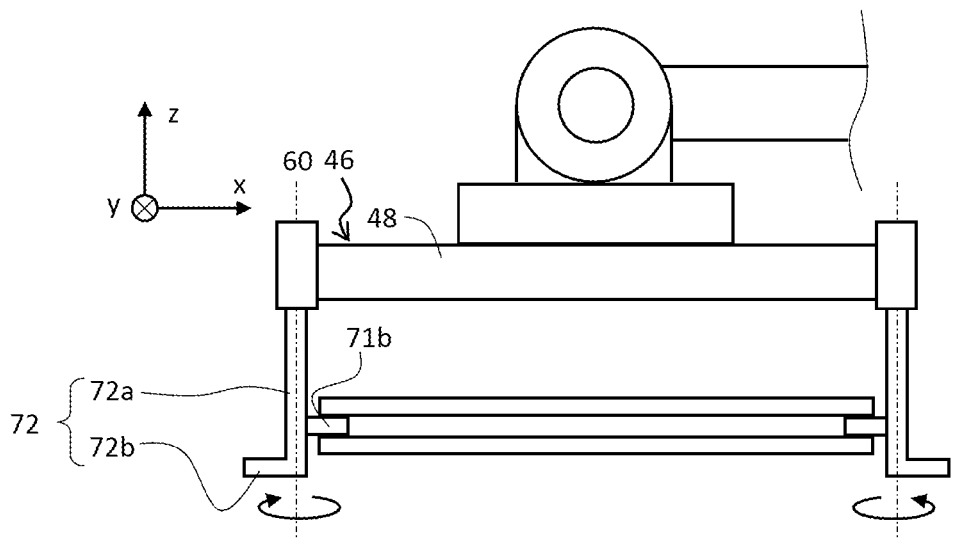

FIG. 18 shows another variation of the first and second arms.

Figure 19:
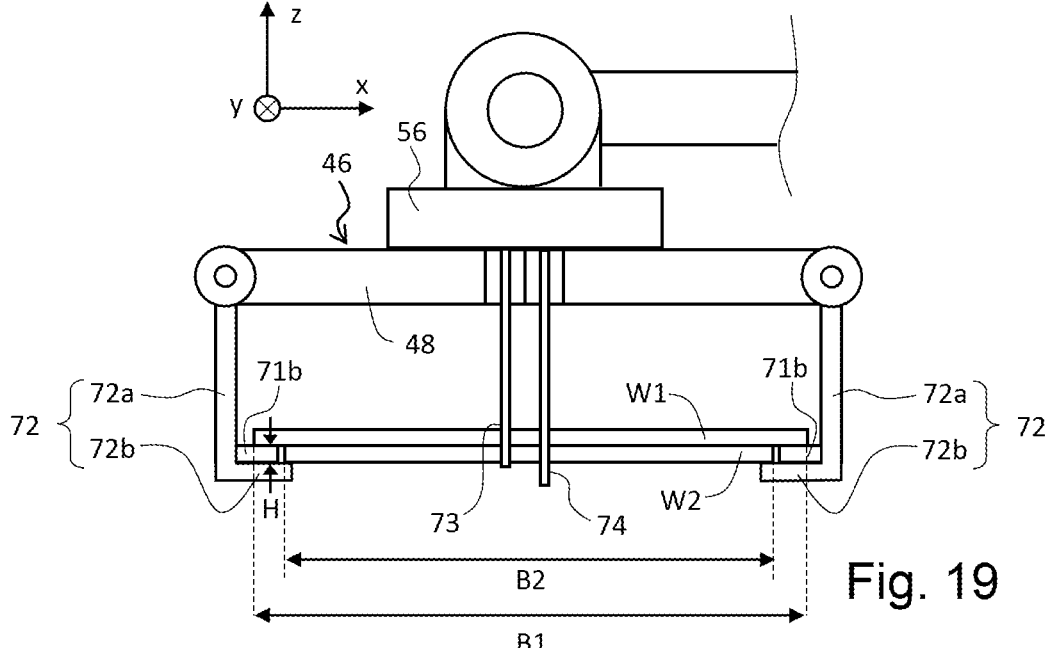

FIG. 19 shows a variation of the support structure of the transportation apparatus for heated workpieces.

Figure 20:
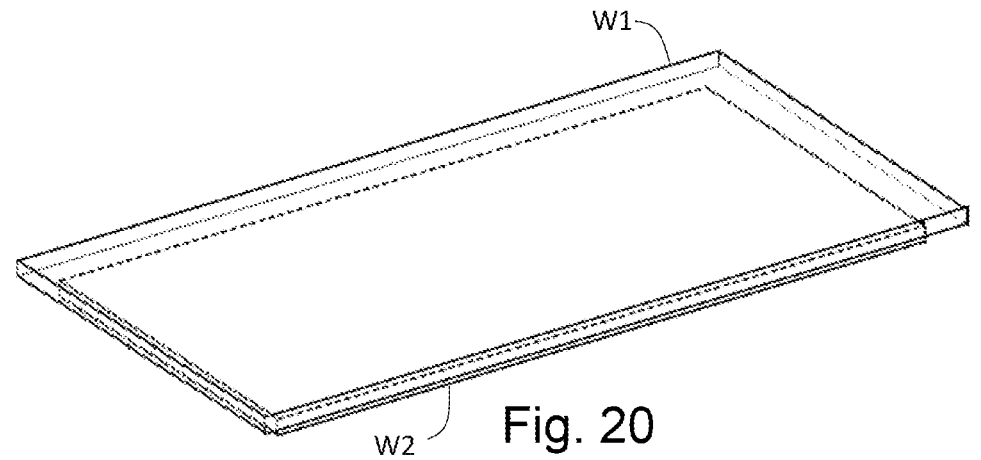

FIG. 20 is a perspective view of the first and second heated workpieces shown in FIG. 19.

Figure 21:
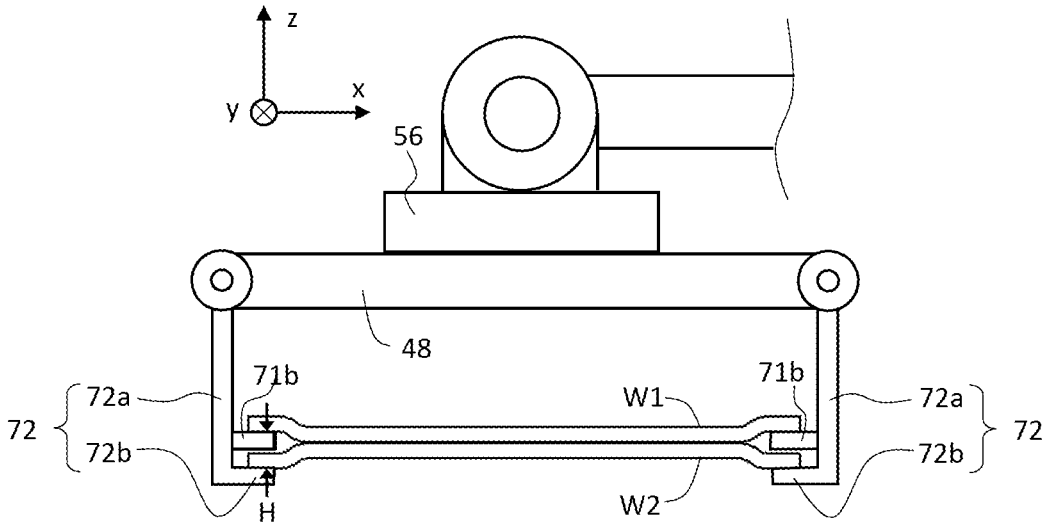

FIG. 21 shows a variation of the support structure of the transportation apparatus for heated workpieces.

Figure 22:
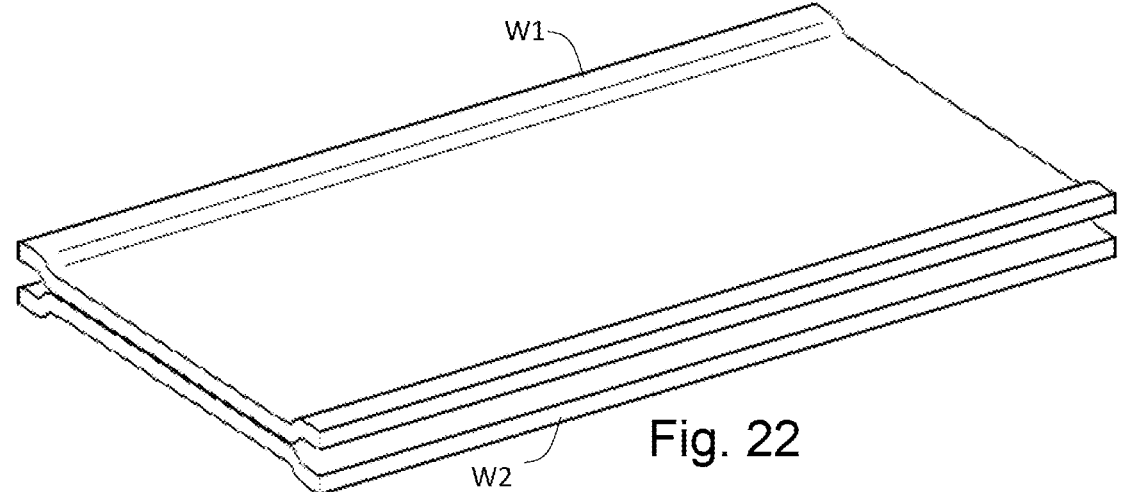

FIG. 22 is a perspective view of the first and second workpieces shown in FIG. 21.

Figure 23:
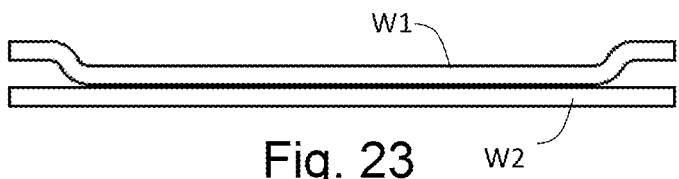

FIG. 23 shows a variation of the first and second workpieces shown in FIG. 21.

Figure 24:
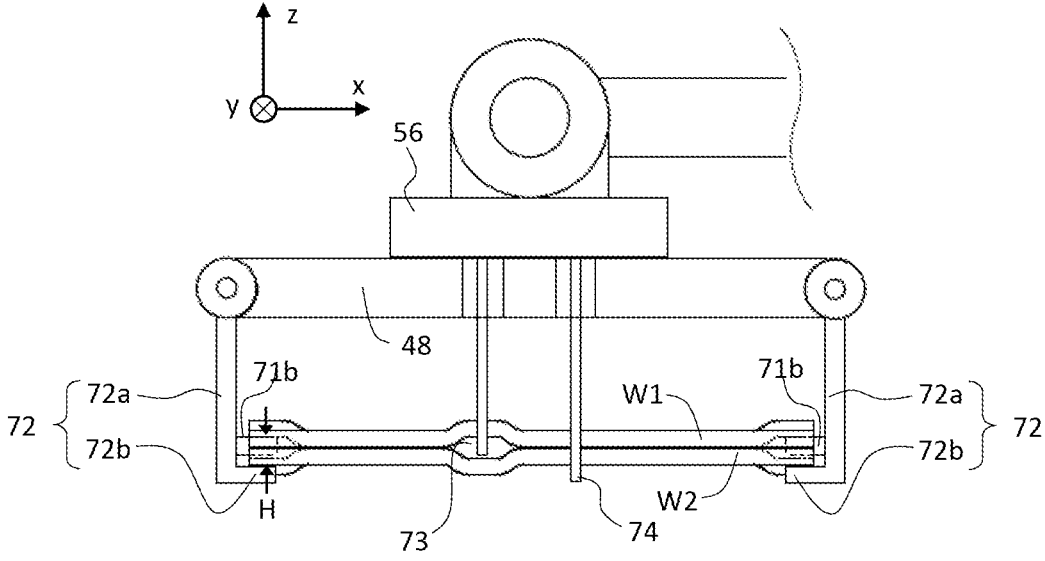

FIG. 24 shows a variation of the support structure of the transportation apparatus for heated workpieces.

Figure 25:
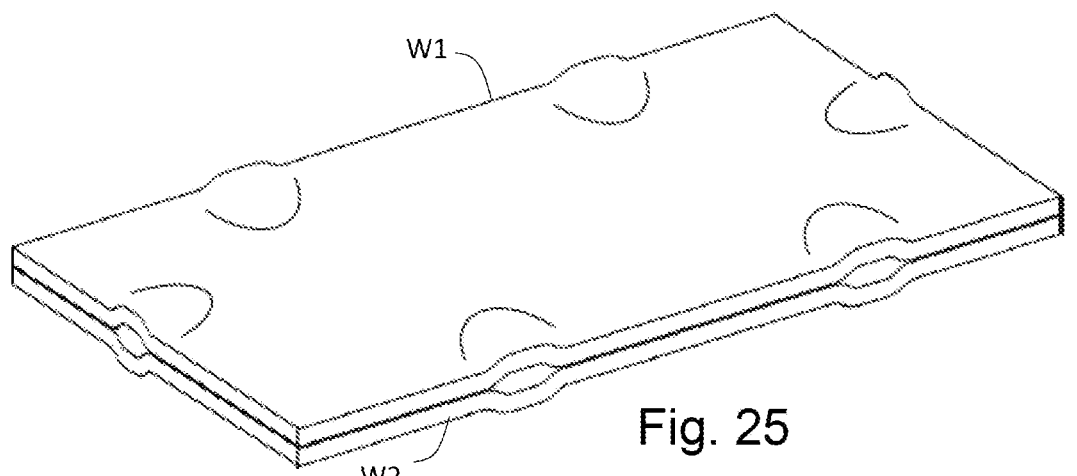

FIG. 25 is a perspective view of the first and second heated workpieces shown in FIG. 24.

Figure 26:
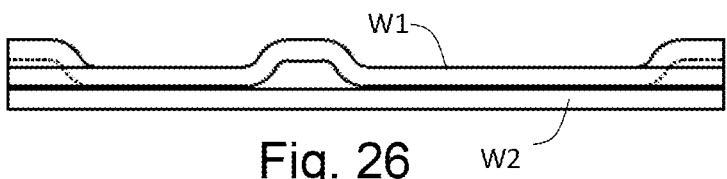

FIG. 26 shows a variation of the first and second heated workpieces shown in FIG. 24.

Figure 1:
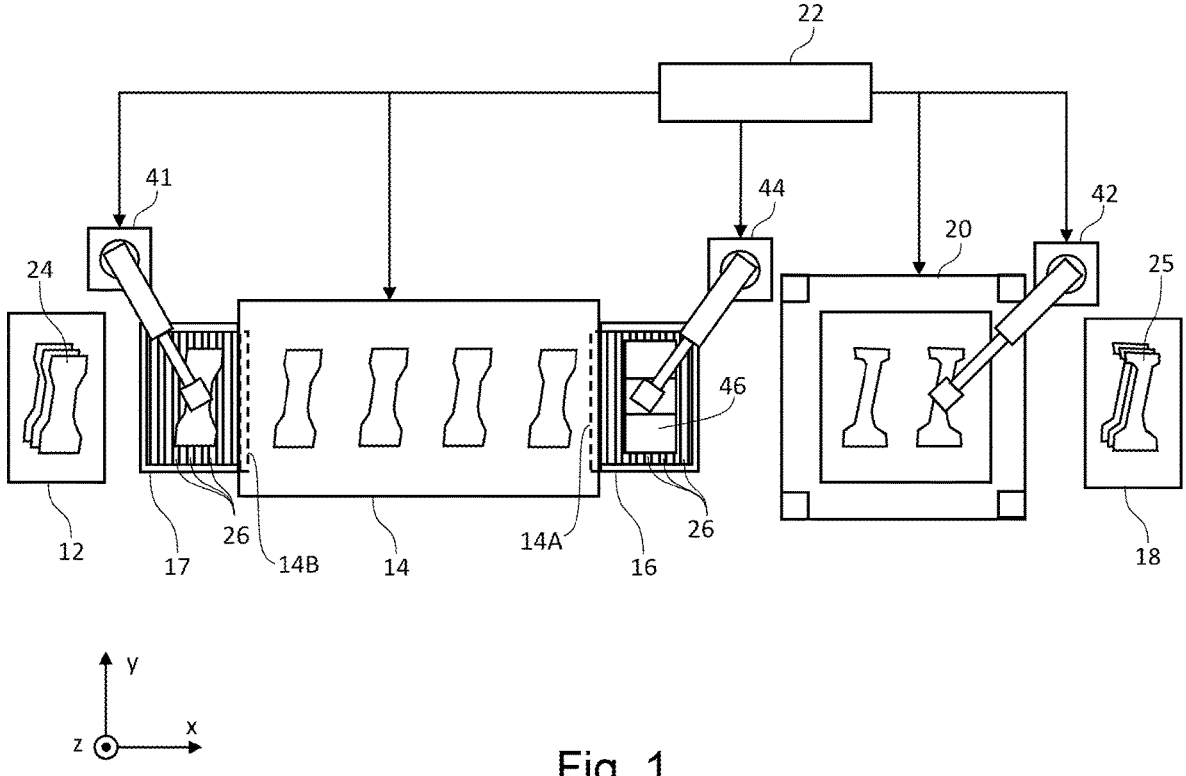
FIG. 1 is a schematic plan view of a hot-press manufacturing line according to an embodiment.
Figure 27:
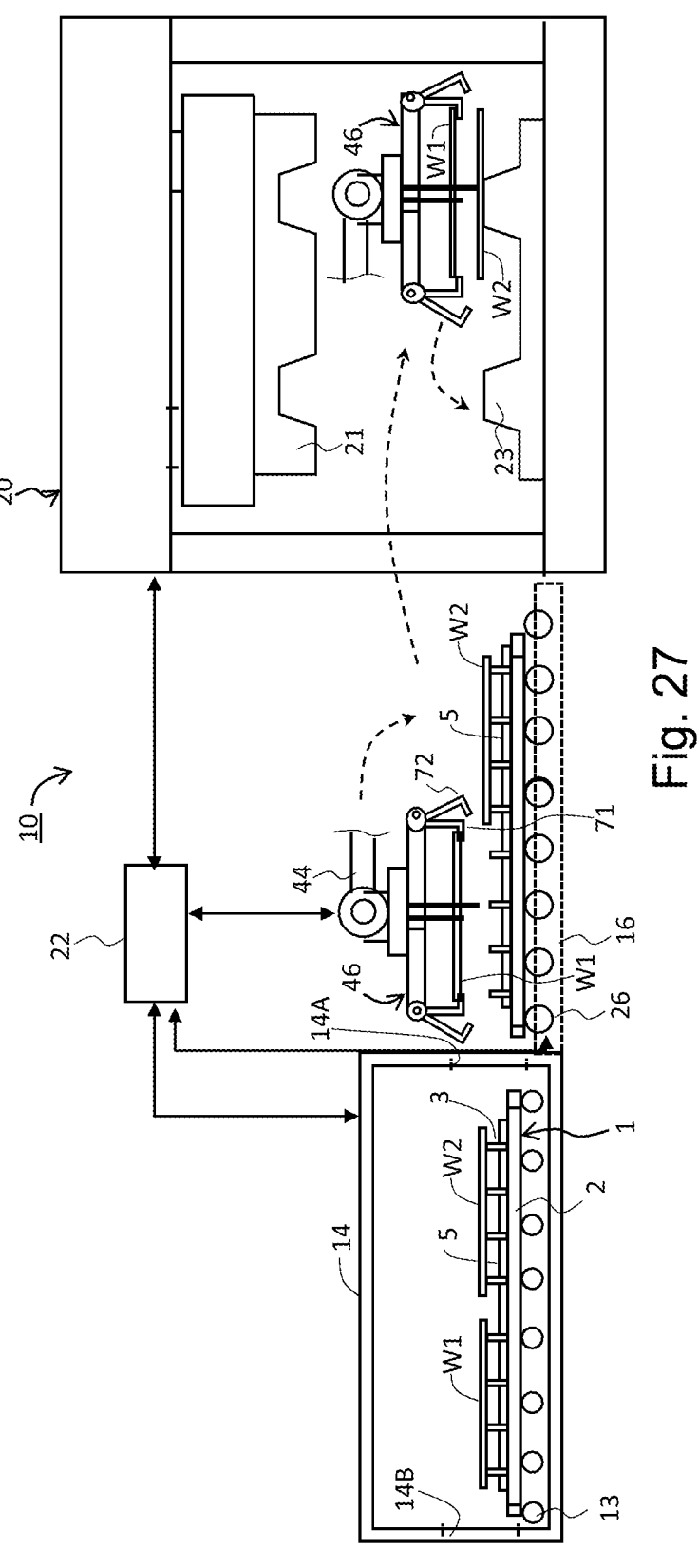

FIG. 27 shows a variation of the hot-press manufacturing line 10 shown in FIG. 1.

Figure 28:
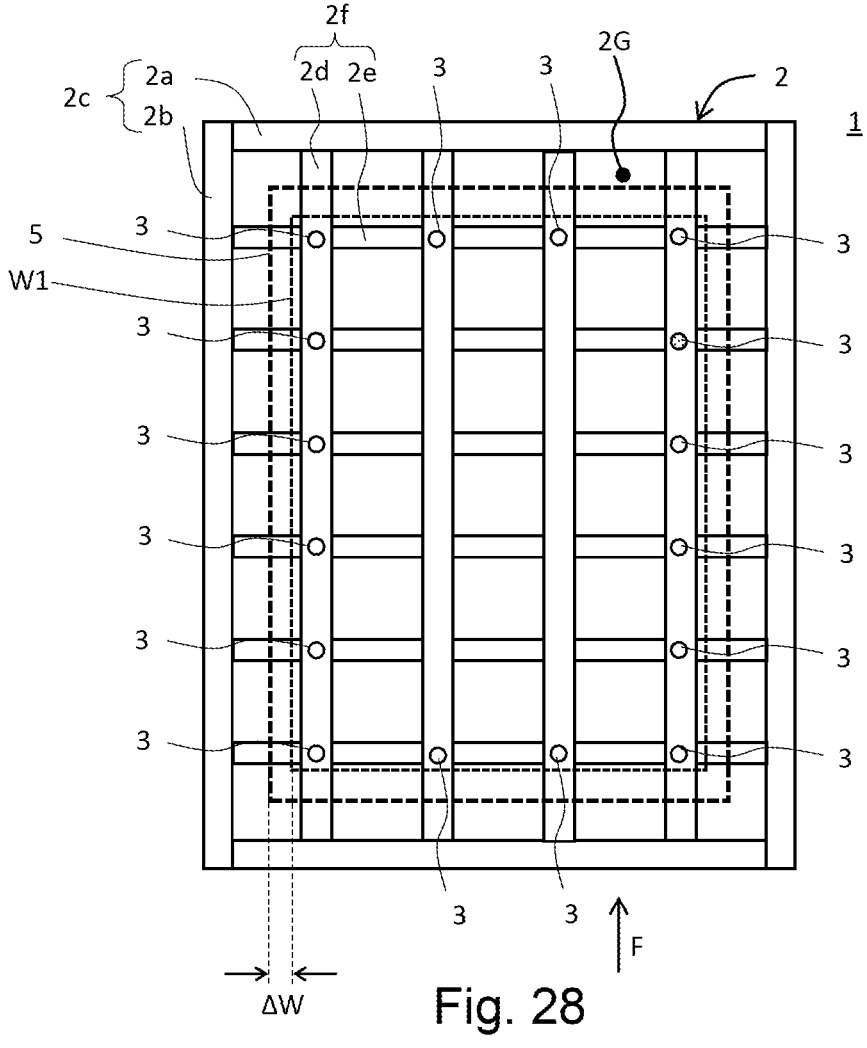

FIG. 28 is a top view of the tray 1 shown in FIG. 27.

Figure 29:
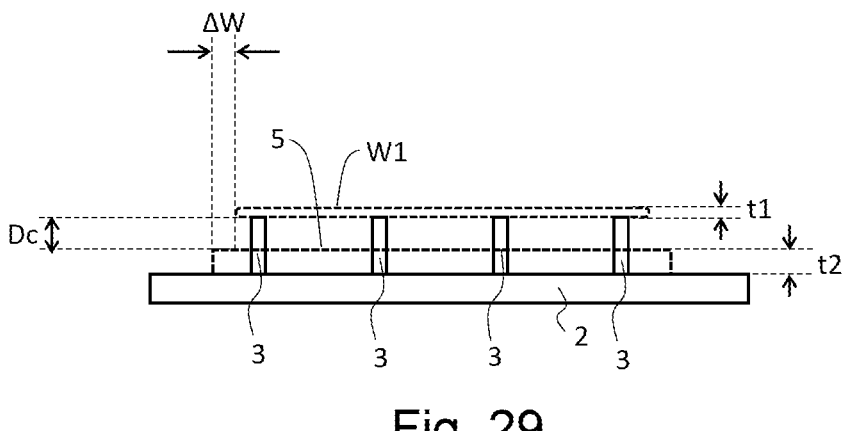

FIG. 29 is a side view of the tray shown in FIG. 28 as viewed in the direction of arrow F.

Figure 30:
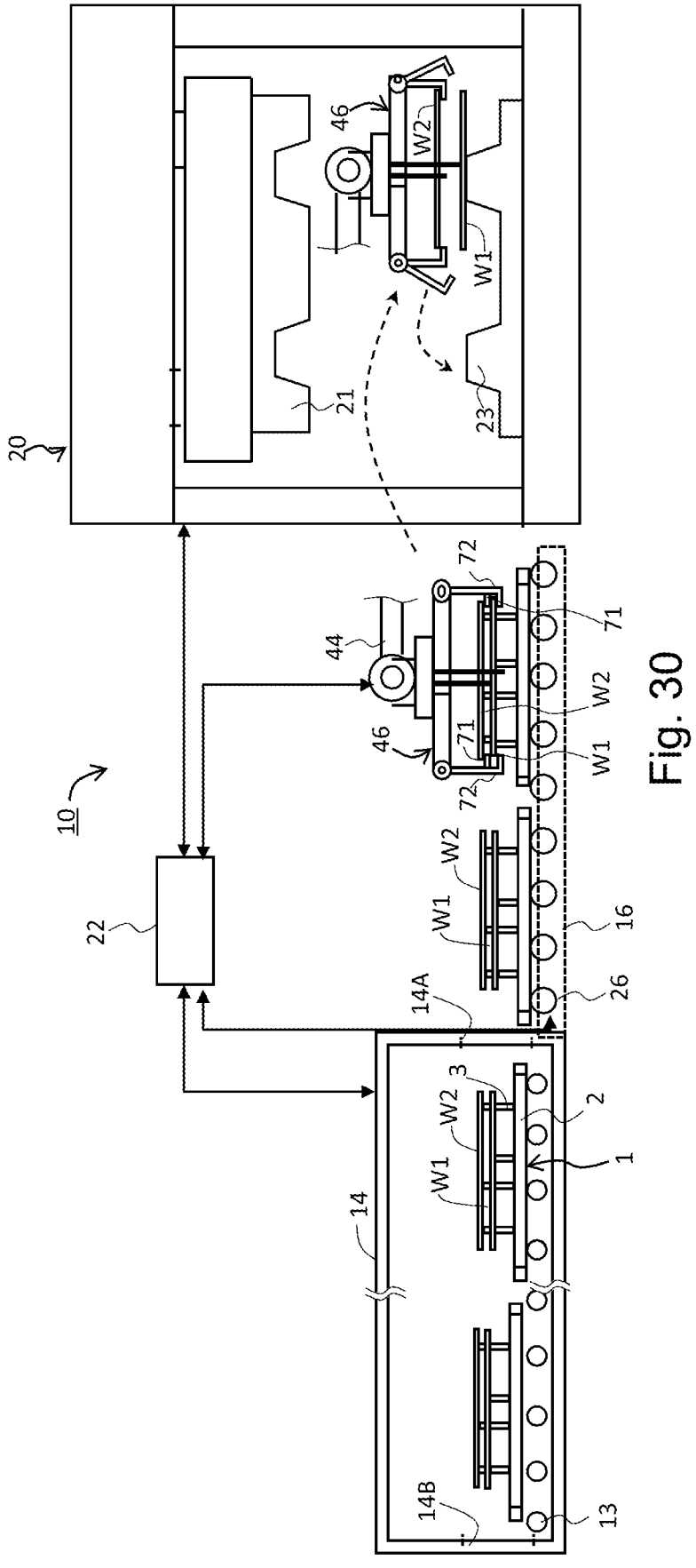

FIG. 30 shows a variation of the hot-press manufacturing line 10 shown in FIG. 1.

Figure 31:
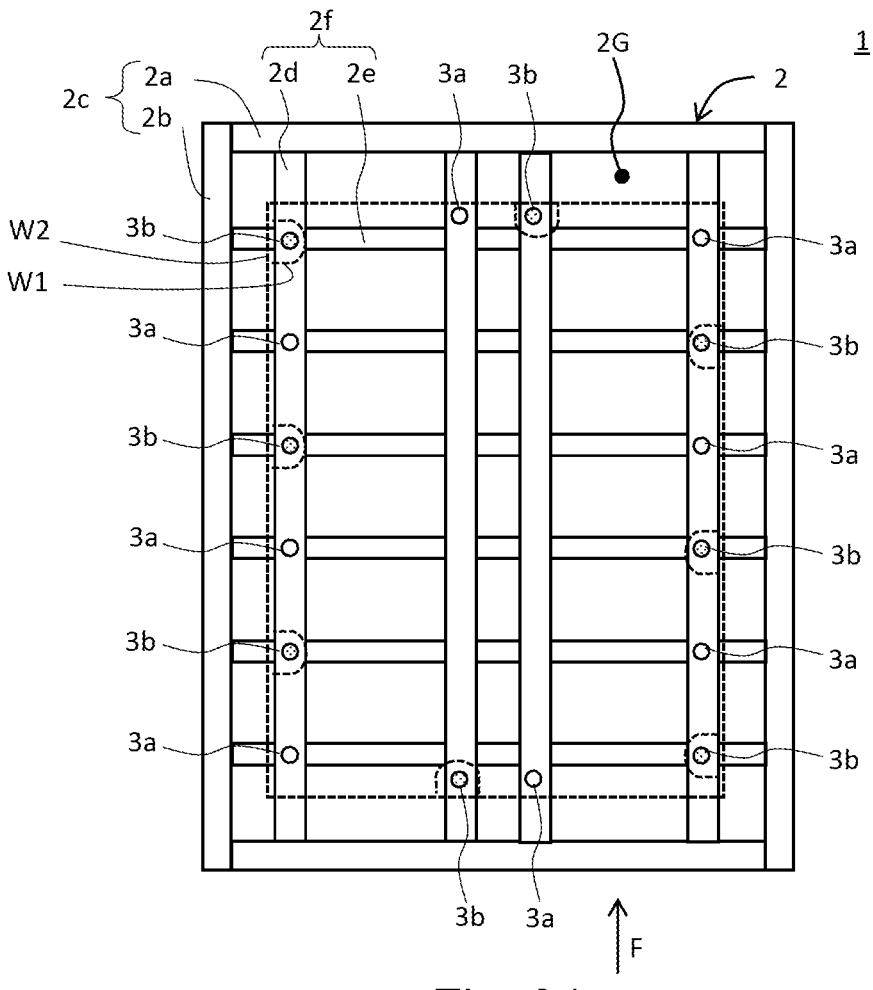

FIG. 31 is a top view of the tray 1 shown in FIG. 30.

Figure 32:
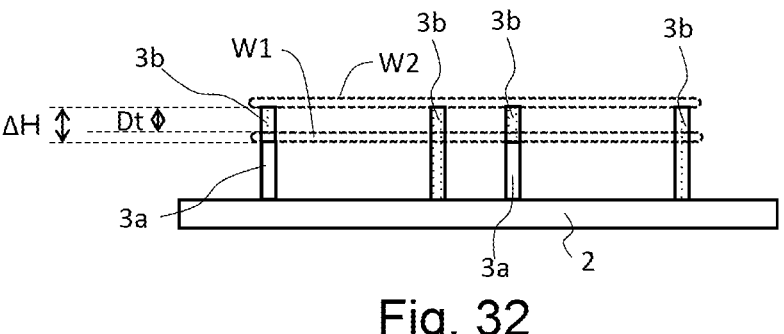

FIG. 32 is a side view of the tray shown in FIG. 31 as viewed in the direction of arrow F.

Figure 33:
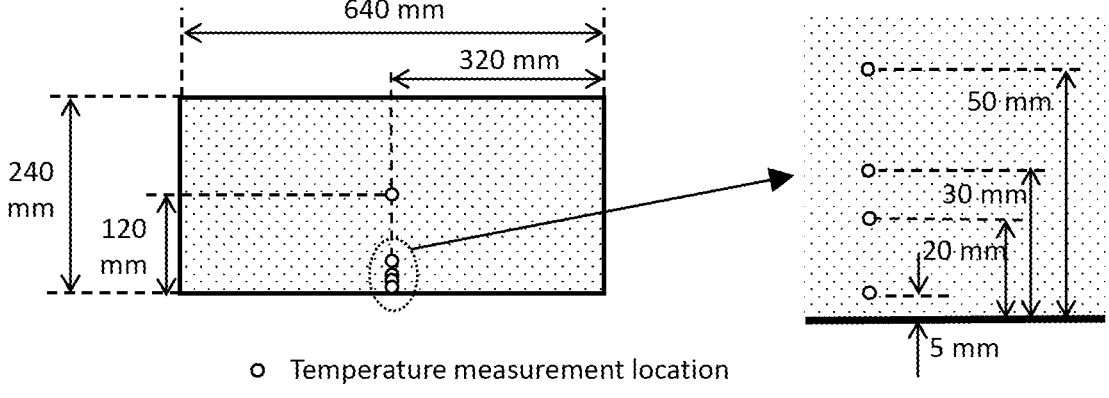

FIG. 33 indicates locations at which temperature is measured in Experiment 1.

Figure 34:
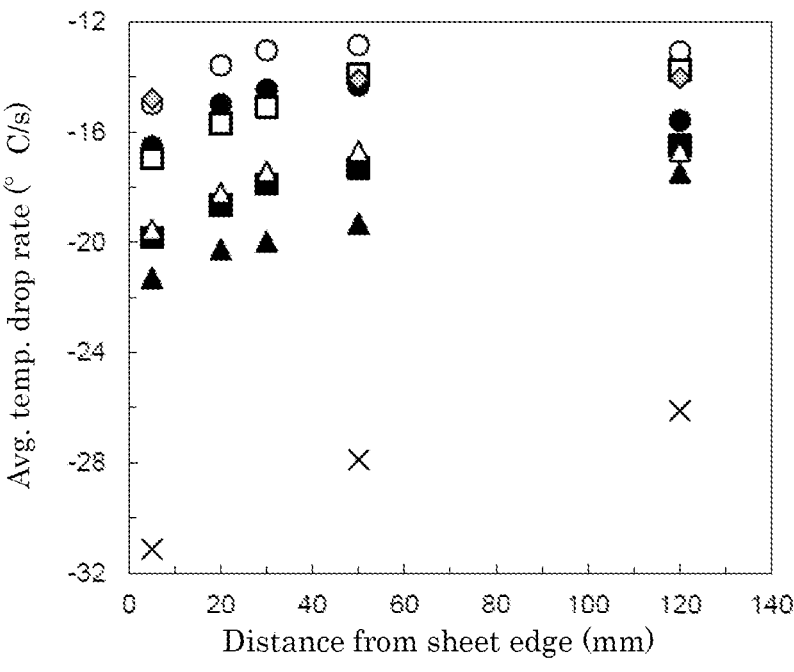

FIG. 34 is a graph of measurements of average temperature drop rate.

Figure 35:
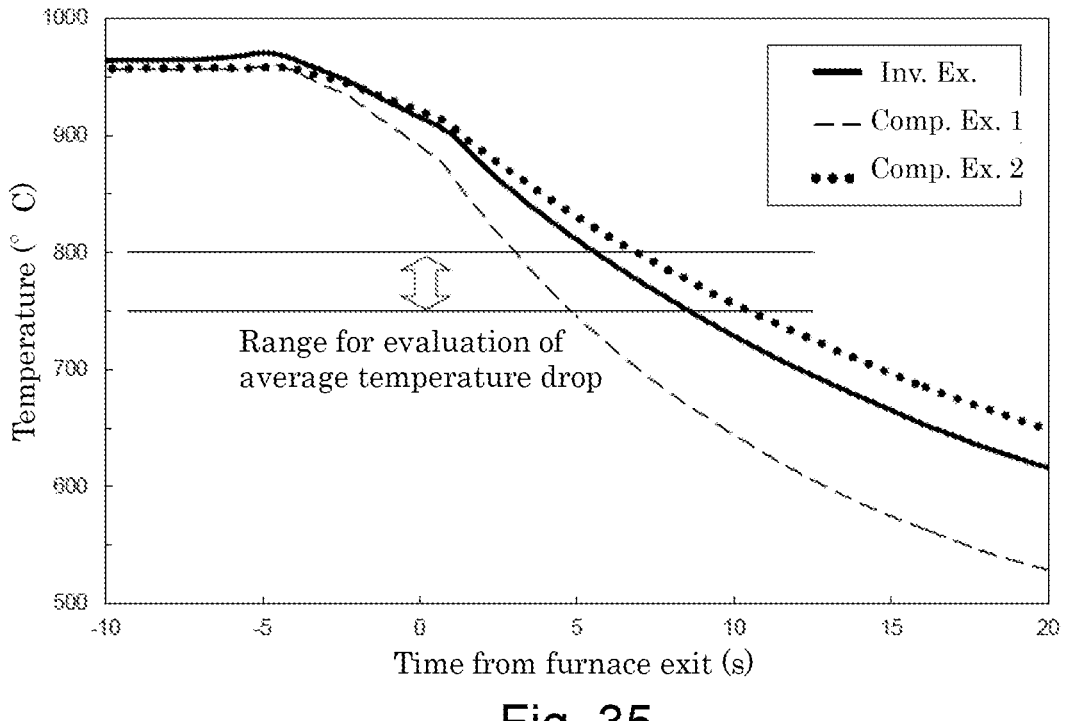

FIG. 35 is a graph indicating the range from which the average temperature drop rates were derived.

Figure 36:
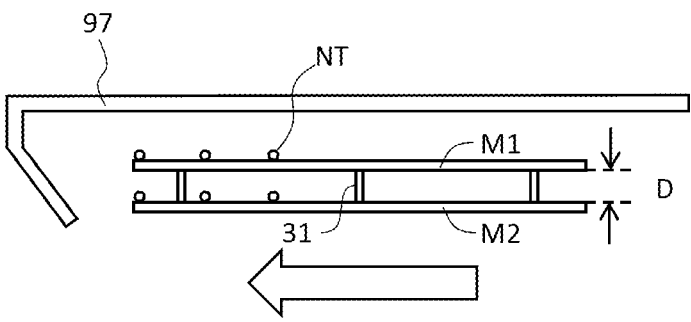

FIG. 36 shows the construction of the shield used in Experiment 2.

Figure 37:
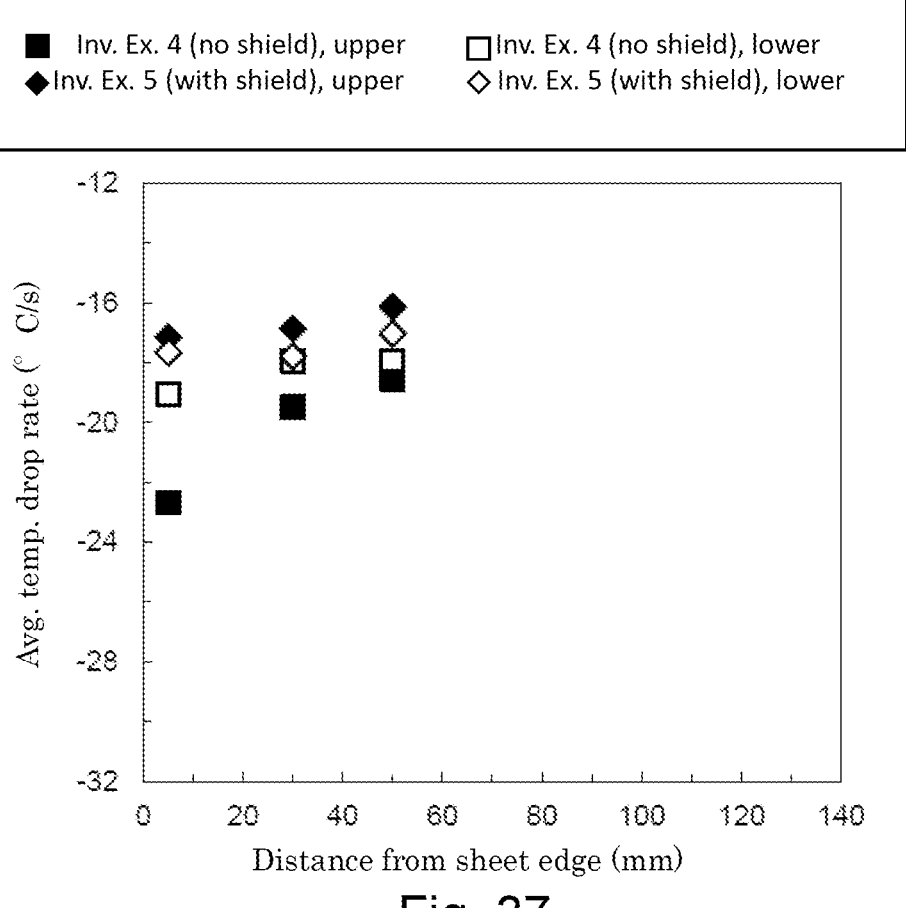

FIG. 37 is a graph of measurements of average temperature drop rate.

Figure 38:
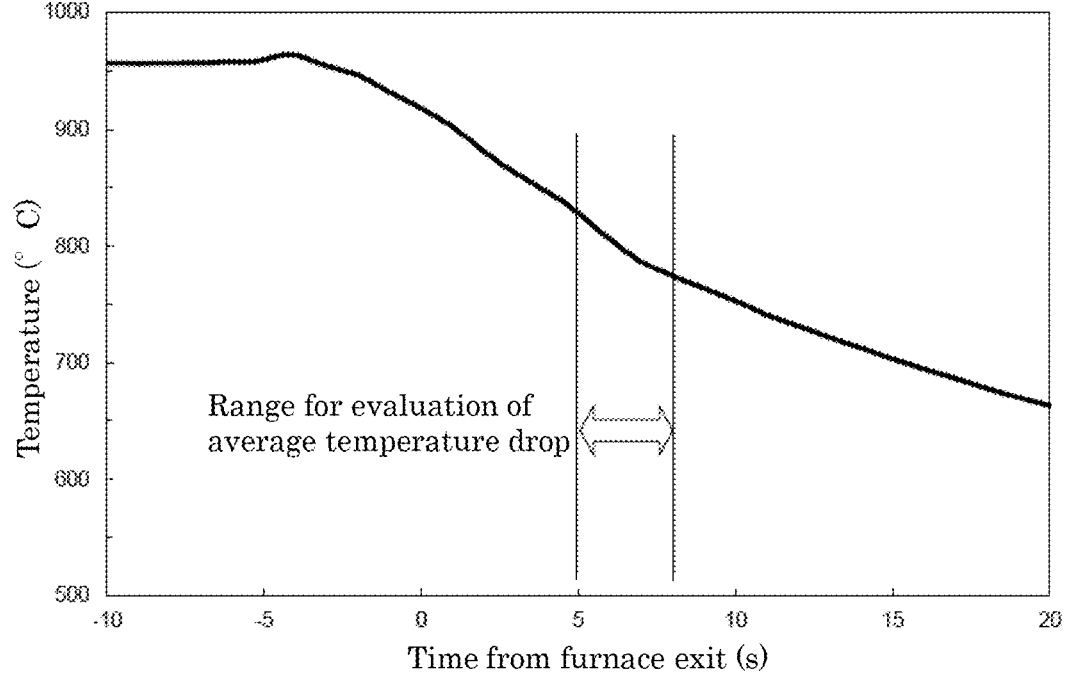

FIG. 38 is a graph indicating the range from which the average temperature drop rates were derived.

EMBODIMENTS FOR CARRYING OUT THE INVENTION

In hot press-forming, the temperature at the beginning of press-forming depends on the temperature to which material is heated and on the amount of temperature decrease after heating of the material in the period of time for which the material is transported to the die for press-forming. The temperature to which material is heated depends on metallurgical conditions. The period of time of transportation to the die after heating depends on the construction and/or specifications of the equipment. The amount of temperature decrease during this transportation depends on the heat capacity of the material. For example, in the case of a steel sheet, heat escapes mainly through heat transfer and heat radiation (or simply radiation) from the upper and lower surfaces to the atmosphere. The inventors found that the amount of temperature decrease significantly depends on the sheet thickness of the material. More specifically, as discussed above, as the sheet thickness of material decreases, the amount of temperature decrease increases even for the same transportation time, potentially making it difficult to provide a forming initiation temperature required for quenching. As a result, there may be cases where a part does not provide a strength required for press-forming.

The inventors did research to find a way to reduce temperature drop during transportation without an additional heat source. This research led to an arrangement where a plurality of material sheets (i.e., workpieces) that are heated simultaneously are arranged in a direction perpendicular to the surfaces of the sheets (i.e., perpendicular-to-surface direction) and transported simultaneously. In this arrangement, the heated workpieces that face each other receive radiant heat from each other, thereby providing supplemental amounts of heat to each other. Further, the heated workpieces that face each other define a space in which air warmed by heat transfer from both heated workpieces stays, which produces a temperature-retaining effect. This reduces temperature drop during transportation.

The inventors did further research to find a method and apparatus for transporting a plurality of heated sheet-shaped workpieces that are arranged in the perpendicular-to-surface direction. The transportation apparatus accesses and lifts, in the perpendicular-to-surface direction, each of the plurality of workpieces heated by the heating device, and holds the workpieces such that they overlap each other in the perpendicular-to-surface direction. Further, to reduce temperature drop, it is preferable to reduce the distance between the workpieces during transportation and increase the overlap in the perpendicular-to-surface direction. Furthermore, the inventors found that the temperature drop near the ends of workpieces during transportation can easily be affected by the distance between the workpieces. Based upon all this, the inventors did further extended research and found that a suction pad is not suitable for achieving simple and efficient transportation while reducing temperature drop. That is, if a plurality of workpieces with a large overlap in the perpendicular-to-surface direction are held with a small distance between the workpieces and transported, a suction pad can only hold the topmost workpiece. Further, heat is removed by the suction pad through the contact between the pad and workpiece, which results in a region of decreased temperature corresponding to the area of contact with the pad. To hold and transport a workpiece, there are limits on size reduction of a suction pad. Accordingly, in applications with workpieces with small sheet thicknesses, the region of decreased temperature and the amount of temperature decrease due to the contact with the pad cannot be ignored when determining the quality of quenching of the formed product. The inventors arrived at using a transportation apparatus including a plurality of pairs of arms that support the lower surface, at both ends, of each of a plurality of workpieces to keep the distance between the workpieces at a small level in a stable manner during transportation. They found that such an arrangement can keep a plurality of workpieces under similar conditions regardless of the locations of the workpieces and, at the same time, allow a plurality of workpieces to be kept at suitable locations for reducing temperature drop during transportation. Further, such an arrangement can enable efficient lifting and lowering of a plurality of workpieces. The following embodiments are based on these finding.

(Manufacturing Method 1)

A method of manufacturing a press-formed product according to an embodiment of the present invention includes: a heating step in which at least two sheet-shaped workpieces are simultaneously heated by a heating device; a transportation step in which the at least two heated workpieces heated at the heating step are transported by a transportation apparatus to a press machine; and a pressing step in which the at least two heated workpieces transported to the press machine at the transportation step are processed by the press machine. The transportation step includes:

driving a pair of first arms rotatably mounted on a base frame included in the transportation apparatus to cause claws of the pair of first arms to support a lower surface, at both ends, of a first heated workpiece of the at least two heated workpieces and lift the workpiece;

driving, using a system separate from that for the pair of first arms, a pair of second arms rotatably mounted on the base frame included in the transportation apparatus to cause claws of the pair of second arms to support a lower surface, at both ends, of a second heated workpiece of the at least two heated workpieces and lift the workpiece;

transporting the first heated workpiece with the lower surface supported, at both ends, by the claws of the pair of first arms of the transportation apparatus and the second heated workpiece with the lower surface supported, at both ends, by the claws of the pair of second arms, where the first and second heated workpieces overlap each other in a direction normal to a sheet surface of the first heated workpiece;

driving the pair of first arms to lower the first heated workpiece supported by the pair of first arms to a pressing location (i.e., first pressing location) on the press machine; and driving the pair of second arms using the system separate from that for the pair of first arms to lower the second heated workpiece supported by the pair of second arms to a pressing location (i.e., second pressing location) on the press machine.

According to Manufacturing Method 1, the first and second heated workpieces are transported while the lower surface, at both ends, of the first workpiece is supported by the claws of a pair of first arms, and the lower surface, at both ends, of the second workpiece is supported by the claws of a pair of second arms. This allows a simple apparatus arrangement to transport the first and second heated workpieces while they are efficiently receiving heat radiation from each other. Since the first and second heated workpieces, each at both ends, are supported by the first and second pairs of claws, respectively, the distance between the two workpieces at both ends can be kept in a stable manner. That is, since the first and second pairs of claws support the first and second heated workpieces, respectively, from below to hold them, their tips can take a relatively simple and thin shape. Further, the workpieces can be kept close to each other more easily than in arrangements using a suction pad to hold them. Further, a plurality of workpieces can be kept under similar conditions regardless of the locations of the workpieces. Thus, for example, the area of overlap between the first and second heated workpieces in the perpendicular-to-surface direction can be increased, and the distance between the first and second heated workpieces can be maintained at a small level in a stable manner. Further, since the first and second pairs of arms are driven with separate systems, the first and second heated workpieces may be lifted successively, and the first and second heated workpieces may be lowered successively to different pressing locations. Thus, the above manufacturing method enables simple and efficient transportation while reducing temperature drop in the first and second heated workpieces. That is, in hot press-forming, temperature drop in the workpieces (i.e., material) can be reduced in a simple manner during the transportation period after heating of the material until beginning of press-forming.

[Manufacturing Method 2]

It is preferable that, during the transportation step of Manufacturing Method 1, the first heated workpiece with the lower surface supported, at both ends, by the claws of the pair of first arms, and the second heated workpiece with the lower surface supported, at both ends, by the claws of the pair of second arms, are transported while overlapping with a distance not larger than 50 mm in the direction normal to the sheet surface of the first heated workpiece. This effectively reduces temperature drop in the heated workpieces during transportation. An excessively large distance between heated workpieces increases that proportion of heat radiation, at the ends of the first and second heated workpieces, emitted from one heated workpiece in directions oblique to the normal to the sheet surface which does not reach the other (opposite) heated workpiece. As a result, the effect of reducing temperature drop may not be sufficiently produced. Further, if the distance between heated workpieces is too large, air warmed by heat transfer from the two heated workpieces cannot easily stay between the two workpieces, which means that the temperature-retaining effect may not be sufficiently produced.

It is preferable that, during the transportation step of Manufacturing Method 1 or 2, the first heated workpiece with the lower surface supported, at both ends, by the claws of the pair of first arms, and the second heated workpiece with the lower surface supported, at both ends, by the claws of the pair of second arms, are transported while overlapping with a distance in the direction normal to the sheet surface of the first heated workpiece. Thus, during transportation, the upper and lower surfaces of each of the first and second heated workpieces are in contact with air. This reduces the differences in the conditions of the upper and lower surfaces during transportation compared with implementations where the first and second workpieces are in contact with each other. This reduces differences in quality between the upper and lower surfaces of each of the first and second heated workpieces.

It is preferable that, in those supported portions of an upper one of the first and second heated overlapping workpieces being transported which are supported by the claws of the arms, the distance between the first and second heated workpieces in the direction normal to the sheet surface of the first heated workpiece is not smaller than 3 mm, for example. For example, if the first and second heated workpieces have the same shape when viewed from above and overlap each other in the direction normal to the sheet surface of the first heated workpiece, then, the claws of the pair of arms that support the upper one of the first and second heated workpieces are inserted between the upper and lower heated workpieces. Thus, if the distance between the heated workpieces is too small, the thickness of the portions of the arms that support the lower surface the upper heated workpiece must be reduced accordingly. As a result, a sufficient strength for supporting a heated workpiece may not be provided. In view of this, at least in the portions of the upper heated workpiece supported by the claws, the distance between the first and second heated workpieces may be 3 to 50 mm.

(Manufacturing Method 3)

It is preferable that, during the transportation step of Manufacturing Method 1, a maximum distance D (mm) between the first heated workpiece with the lower surface supported, at both ends, by the claws of the pair of first arms and the second heated workpiece with the lower surface supported, at both ends, by the claws of the pair of second arms, as measured in the direction normal to the sheet surface, on one hand, and a minimum sheet thickness t (mm) of a thinnest portion of the first and second workpieces, on the other, are in the relationship represented by the expression below. This effectively reduces temperature drop in the heated workpieces during transportation.

$$D \leq 60t$$

(Manufacturing Method 4)

Starting from any one of Manufacturing Methods 1 to 3, it is preferable that one of the first and second heated workpieces overlapping in the direction normal to the sheet surface and being transported by the transportation apparatus has a larger sheet thickness and a larger area than the other and has a large area. This efficiently reduces temperature drop in a workpiece with a small sheet thickness.

(Manufacturing Method 5)

It is preferable that, during the transportation step of any one of Manufacturing Methods 1 to 4, the first heated workpiece with the lower surface supported, at both ends, by the claws of the pair of first arms and the second heated workpiece with the lower surface supported, at both ends, by the claws of the pair of second arms are transported while being covered with a side shield from a front as determined along a direction of transportation. The shield prevents air from directly hitting the side of each heated workpiece located at the front as determined along the direction of transportation, thereby reducing temperature drop in that side of each heated workpiece and, at the same time, preventing air staying between the two heated workpieces that has been warmed by heat transfer from the two heated workpieces from moving to the outside, thereby retaining the temperature-retaining effect. This further reduces temperature drop in the heated workpieces during transportation.

(Manufacturing Method 6)

Starting from Manufacturing Method 5, it is preferable that the side shield has an inclined surface inclined so as to be located closer to the first and second heated workpieces going from a center toward an end. This allows air that has hit the shield to flow away from the first and second heated workpieces along the inclined surface. This increases the effect of reducing temperature drop in the heated workpieces during transportation.

(Manufacturing Method 7)

It is preferable that, during the transportation step of any one of Manufacturing Methods 1 to 6, the first heated workpiece with the lower surface supported, at both ends, by the claws of the pair of first arms and the second heated workpiece with the lower surface supported, at both ends, by the claws of the pair of second arms are transported while being covered with an upper shield from above. Warmed air attempts to move upward; thus, beneath the lower heated workpiece, air warmed by heat transfer from the lower heated workpiece can easily stay, which provides the temperature-retaining effect for the lower surface of the lower heated workpiece even without a shield. On the other hand, above the upper heated workpiece, air warmed by heat transfer from the upper heated workpiece moves upward; thus, practically, the temperature-retaining effect of this air is non-existent. Positioning a shield above the upper heated workpiece allows air warmed by heat transfer from the upper heated workpiece to stay between the upper heated workpiece and upper shield. This warmed staying air can produce the temperature-retaining effect for the upper surface of the upper heated workpiece. This further increases the effect of reducing temperature drop in the upper heated workpiece during transportation.

It is preferable that the distance between the upper shield covering the first and second heated workpieces from above and the upper one of the first and second heated workpieces as measured in the direction normal to the sheet surface is not larger than 200 mm, and more preferably not larger than 100 mm, for example. This further increases the upper shield's effect of reducing temperature drop.

The upper shield covering the first and second heated workpieces from above may be located between the base frame and the upper one of the first and second workpieces. This allows the upper shield to be positioned above, and close to, the heated workpieces. This further increases the upper shield's effect of reducing temperature drop.

(Manufacturing Method 8)

Starting from any one of Manufacturing Methods 5 to 7, at least one of the first and second heated workpieces may have a long-length direction and a short-length direction while being transported by the transportation apparatus. In such implementations, during the transportation step, the side shield can cover the first and second heated workpieces along the long-length direction. Covering a workpiece with a side shield along the long-length direction further increases the effect of reducing temperature drop in the heated workpieces during transportation.

(Manufacturing Method 9)

Starting from any one of Manufacturing Methods 1 to 8, each of the first and second heated workpieces may be a differential-thickness sheet with a large-thickness portion and a small-thickness portion. In such implementations, it is preferable that, during the transportation step, the large-thickness portion of the first heated workpiece with the lower surface supported, at both ends, by the claws of the pair of first arms overlaps, in the direction normal to the sheet surface, the small-thickness portion of the second heated workpiece with the lower surface supported, at both ends, by the claws of the pair of second arms. This allows the large- and small-thickness portions to provide supplemental amounts of heat to each other, thereby efficiently reducing temperature drop as a whole.

(Manufacturing Method 10)

Starting from any one of Manufacturing Methods 1 to 9, during the heating step, the heating device may heat the workpieces while the first workpiece being heated is located above a sheet-shaped heat storage member and overlaps the heat storage member in the direction normal to the sheet surface of the first heated workpiece and the second workpiece being heated is located above the heat storage member and overlaps the heat storage member in a direction normal to a sheet surface of the second heated workpiece. The transportation step may include a sub-step in which the heat storage member and the first and second heated workpieces located above the heat storage member are transported altogether from the heating device to a lifting location for the transportation apparatus.

According to Manufacturing Method 10, the heating device heats the first and second workpieces while each workpiece overlaps a sheet-shaped heat storage member in a top-bottom direction. After heating, the first and second heated workpieces, together with the heat storage member, are transported from the heating device to a lifting location. Thus, from heating until lifting by the transportation apparatus, each of the first and second heated workpieces overlaps the heat storage member in the top-bottom direction. That is, each of the first and second heated workpieces overlaps the heat storage member in the direction perpendicular (i.e., normal) to the sheet surfaces of the heated workpieces. For example, the lower surface of the first heated workpiece faces the upper surface of the heat storage member, and the lower surface of the second heated workpiece faces the upper surface of the heat storage member. Thus, after completion of heating and until positioning at the lifting location, the first heated workpiece and heat storage member provide supplemental amounts of heat to each other, and so do the second heated workpiece and heat storage member; and, from lifting by the transportation apparatus at the lifting location and until placing at the pressing location, the first and second heated workpieces provide supplemental amounts of heat to each other. Further, the first and second heated workpieces are positioned above the heat storage member; thus, the lifting operation can be performed in a simple and quick manner. This reduces temperature drop in the material after heating of the material in hot press-forming until beginning of press-forming in a simple manner. The first and second heated workpieces may be transported without overlapping each other in the top-bottom direction, located above the heat storage member.

The sheet-shaped heat storage member is not limited to a flat sheet. For example, the sheet-shaped heat storage member may be a sheet having a projection protruding in the direction normal to the sheet surface, a sheet having an empty space that extends through the sheet, or a curved sheet.

During the heating step, the heat storage member may be placed on a tray body, and each of the first and second workpieces may be heated while being placed on a first group of at least three struts extending from the tray body or the heat storage member upwardly to locations higher than the upper surface of the heat storage member. In such implementations, during the transportation step, the heat storage member placed on the tray body and the first and second heated workpieces, together with the tray body, may be transported from the heating device to the lifting location. In such implementations, the first group of struts do not present an obstacle during lifting upward, by the transportation apparatus, of the first and second heated workpieces placed on the first group of struts. Thus, the lifting operation can be done in a simple and quick manner.

The heat storage member may include a projection protruding upward. During the heating step, each of the first and second workpieces may be heated while being placed on the projection of the heat storage member. During the transportation step, the first and second heated workpieces may be transported from the heating device to the lifting location while being placed on the projection of the heat storage member. This allows the transportation apparatus to perform the operation of lifting the workpieces upward in a simple and quick manner.

It is preferable that the maximum distance Dc (mm) for the distance in the top-bottom direction between the heat storage member and the first heated workpiece and the distance in the top-bottom direction between the heat storage member and the second heated workpiece, on the one hand, and the minimum sheet thickness t1 (mm) of the thinnest portion of the first and second heated workpieces, on the other, is in the relationship represented by the expression below. This efficiently reduces temperature drop in the first and second heated workpieces during transportation.

$$Dc \leq 120 t1$$

The minimum sheet thickness t1 (mm) of the thinnest portion of the first and second heated workpieces and the minimum sheet thickness t2 (mm) of the thinnest portion of the heat storage member may be in the relationship represented by the expression below. This effectively reduces temperature drop in the workpieces.

$$0.8 \leq t2/t1 \leq 20$$

(Manufacturing Method 11)

Starting from any one of Manufacturing Method 1 to 9, during the heating step, the first and second workpieces are heated by the heating device while the first workpiece being heated may be placed on a first group of at least three struts extending upwardly from a tray body having an empty space extending therethrough in a top-bottom when viewed from above, and the second workpiece being heated may be placed on a second group of at least three struts extending upwardly from the tray body and positioned above the first workpiece being heated to overlap the first workpiece being heated in the direction normal to the sheet surface of the first workpiece being heated. The transportation step may include a sub-step in which the first and second heated workpieces, together with the tray body, are transported from the heating device to a lifting location for the transportation apparatus while the first heated workpiece is placed on the first group of struts, the second heated workpiece is placed on the second group of struts and positioned above the first heated workpiece to overlap the first heated workpiece in the direction normal to the sheet surface of the first heated workpiece.

According to Manufacturing Method 11, the heating device heats the first and second workpieces while the workpieces are supported by the group of struts on the tray to overlap each other in the top-bottom direction. After heating, the first and second heated workpieces, together with the tray, are transported from the heating device to the lifting location. Thus, the first and second heated workpieces remain overlapping in the top-bottom direction since they exit the heating device until being lifted by the transportation apparatus. That is, the first and second heated workpieces remain overlapping in the direction perpendicular (i.e., normal) to the sheet surface of the first heated workpiece. For example, the upper surface of the first heated workpiece faces the lower surface of the second heated workpiece. This allows the first and second heated workpieces to provide supplemental amounts of heat to each other as they receive radiant heat from each other from completion of heating until lifting by the transportation apparatus and, then, from lifting by the transportation apparatus until placement on the pressing locations. Further, the first heated workpiece is placed on the first group of struts, above which the second heated workpiece placed on the second group of struts is positioned. The groups of struts are shaped to extend upwardly from the tray body. Thus, the groups of struts do not present an obstacle when the second and first heated workpieces placed on the groups of struts are lifted successively or simultaneously upward by the transportation apparatus. This enables a simple and quick lifting operation. This reduces, in a simple manner, temperature drop in the material during the transportation period, i.e., after heating of the material in hot press-forming until beginning of press-forming.

It is preferable that, during the heating step and the transportation step, the maximum distance Dt (mm) in the top-bottom direction between the first heated workpiece placed on the first group of struts and the second heated workpiece placed on the second group of struts, and, on the one hand, the minimum sheet thickness t (mm) of the thinnest portion of the first and second heated workpieces, on the other, are in the relationship represented by the expression below. This effectively reduces temperature drop in the first and second heated workpieces during transportation.

$$Dt \leq 120t$$

For the same reasons, $Dt \leq 100t$ is more preferable, and $Dt \leq 60t$ is yet more preferable. Further, the distance between the first heated workpiece placed on the first group of struts and the second heated workpiece placed on the second group of struts is preferably not larger than 100 mm, and more preferably not larger than 50 mm, for example.

(Arrangement 1)

An apparatus for transporting a heated workpiece according to an embodiment of the present invention includes: a base frame movable in a lateral direction perpendicular to a top-bottom direction; a pair of first arms rotatably mounted on the base frame; a pair of second arms rotatably mounted on the base frame; a first drive unit adapted to drive the first arms; and a second drive unit adapted to drive the second arms.

The pair of first arms include: a pair of first bases arranged in the lateral direction of the base frame and extending from the base frame in the top-bottom direction; and a pair of first claws extending, with a bend, from the respective first bases in the lateral direction.

The pair of second arms include: a pair of second bases arranged in the lateral direction of the base frame and extending from the base frame in the top-bottom direction; and a pair of second claws extending, with a bend, from the respective second bases in the lateral direction.

The first drive unit rotates the pair of first arms relative to the base frame to change a lateral distance between the first claws.

The second drive unit rotates the pair of second arms relative to the base frame to change a lateral distance between the second claws.

The first and second drive units are configured, independently from each other, to be capable of controlling rotation of the first arms and rotation of the second arms, respectively.

The pair of first claws are capable, when close to each other in the lateral direction, of supporting a lower surface of the first heated workpiece at both ends as determined along the lateral direction.

The pair of second claws are capable, when close to each other in the lateral direction, of supporting a lower surface of the second heated workpiece at both ends as determined along the lateral direction.

A location of the pair of first claws in the top-bottom direction and a location of the pair of second claws in the top-bottom direction are different from each other.

The transportation apparatus transports the first and second heated workpieces while the lower surface of the first heated workpiece is supported, at both ends, by the claws of the pair of first arms and the lower surface of the second heated workpiece is supported, at both ends, by the claws of the pair of second arms. This retains the distance between the two workpieces during transportation in a stable manner. Further, the first and second claws are positioned at the lower surfaces of the workpieces at both ends through the rotation of the first and second arms, thereby enabling simple and reliable operations of lifting and lowering the heated workpieces. That is, a simple apparatus construction may be used to allow the first and second heated workpieces to be transported while they are efficiently receiving heat radiation. Further, the first drive unit drives the first arms and, independently i.e. in a separate system, the second drive unit drives the second arms. This allows the first and second heated workpieces to be lifted successively, and allows the first and second heated workpieces to be lowered successively to different pressing locations. Thus, the transportation apparatus is capable of simple and efficient transportation while reducing temperature drop in the first and second workpieces. This reduces, in a simple manner, temperature drop in the workpieces (i.e., material) during the transportation period, i.e., after heating of the material in hot press-forming until beginning of press-forming.

Lateral direction of the base frame means a direction in a plane perpendicular to the top-bottom direction. The lateral direction in which the pair of first arms are arranged and the lateral direction in which the pair of second arms are arranged may be the same, or may be different within the plane perpendicular to the top-bottom direction. The base frame may be movable in both the top-bottom direction and the lateral direction(s).

(Arrangement 2)

Starting from Arrangement 1, it is preferable that the pair of first claws and the pair of second claws are spaced apart by a distance of 0 to 50 mm plus a maximum sheet thickness of the heated workpiece supported by one of the pairs of first and second claws located lower in the top-bottom direction. This effectively reduces temperature drop in the heated workpieces during transportation. For example, supposing that the sheet thickness of a heated workpiece varies by about 1 to 3 mm within this one heated workpiece, the maximum sheet thickness of a heated workpiece is 3 mm; thus, it is preferable that the pair of first claws and the pair of second claws are spaced apart by a distance of 3 to 53 mm in the top-bottom direction.

(Arrangement 3)

Starting from Arrangement 1 or 2, the apparatus for transporting a heated workpiece may further include a side shield adapted to cover both the pair of first claws and the pair of second claws from a side. The side shield prevents warmed air staying between the heated workpieces from moving to the outside, thereby retaining the temperature-retaining effect, thus further reducing temperature drop in the heated workpieces during transportation.

(Arrangement 4)

Starting from Arrangement 3, the side shield may include a surface inclined such that it is located closer to the pair of first claws and the pair of second claws going from a center toward an end. This allows air that has hit the side shield to flow away from the heated workpieces along the inclined surface during transportation of the heated workpieces. This increases the effect of reducing temperature drop in the heated workpieces during transportation.

(Arrangement 5)

Starting from any one of Arrangements 1 to 4, the apparatus for transporting a heated workpiece may further include an upper shield adapted to cover a space between the pair of first arms and the pair of second arms from above. Thus, air warmed by heat transfer from the upper heated workpiece can stay between the upper heated workpiece and upper shield. This further increases the effect of reducing temperature drop in the upper heated workpiece during transportation. Preferably, the upper shield overlaps at least part of each of the pair of first claws and the pair of second claws when viewed from above. Thus, the first and second heated workpieces supported by the first and second claws are covered with the upper shield from above. This further increases the upper shield's effect of reducing temperature drop. More preferably, the upper shield covers a larger area than the region defined by the pair of first arms and the pair of second arms when viewed from above. In such implementations, the upper shield also covers areas outside the region defined by the pair of first arms and the pair of second arms as closed when viewed from above. Further, the upper shield may be coupled to the side shield. The upper shield is not limited to a flat sheet, and may be shaped to conform to the shape of the heated workpieces being transported (e.g., intermediate formed products), for example.

It is preferable that the distance in the top-bottom direction between the upper shield covering both the pair of first claws and the pair of second claws from above and the upper one of the pairs of first and second claws is not larger than 200 mm plus the maximum sheet thickness of the heated workpiece supported by the upper one of the pairs of first and second claws, for example. More preferably, this distance is not larger than 100 mm plus the above-mentioned maximum sheet thickness. This further increases the upper shield's effect of reducing temperature drop. For example, supposing that the sheet thickness of a heated workpiece varies by about 1 to 3 mm within this one heated workpiece, the maximum sheet thickness of a heated workpiece is 3 mm; thus, the distance in the top-bottom direction between the upper shield covering both the pair of first claws and the pair of second claws from above and the upper one of the pairs of first and second claws is preferably not larger than 203 mm, and more preferably not larger than 103 mm.

The upper shield covering the first and second claws from above may be located between the base frame and the upper one of the pairs of first and second claws. This allows the upper shield to be positioned above, and close to, the heated workpieces supported by the claws. This further increases the upper shield's effect of reducing temperature drop.

(Arrangement 6)

Starting from any one of Arrangements 1 to 5, the base frame may be rotatable by 180 degrees about an axis in the top-bottom direction. This allows the orientations of the first heated workpiece supported by the claws of the first arms and the second heated workpiece supported by the claws of the second arms to be changed by 180 degrees. Thus, if the heated workpieces are differential-thickness sheets, for example, the orientations of the first and second heated workpieces may be changed by 180 degrees and kept in this state. This allows the first and second heated workpieces to be kept such that the small-thickness portion of one workpiece overlaps the large-thickness portion of the other workpiece, for example.

(Arrangement 7)

Starting from any one of Arrangements 1 to 6, a distance between the pair of first claws and the pair of second claws as measured in the top-bottom direction may be adjustable. This allows the distance between the first and second heated workpieces during transportation to be adjusted depending on the sheet thickness and material of the workpieces and/or other conditions.

(Arrangement 8)

Starting from any one of Arrangements 1 to 7, the apparatus for transporting a heated workpiece may further include: a pair of third arms rotatably mounted on the base frame; a pair of fourth arms rotatably mounted on the base frame; a third drive unit adapted to drive the third arms; and a fourth drive unit adapted to drive the fourth arms.

The pair of third arms include: a pair of third bases arranged in a lateral direction of the base frame that is perpendicular to the direction in which the pair of first bases are arranged, and extending from the base frame in the top-bottom direction; and a pair of third claws extending, with a bend, from the respective third bases in the lateral direction.

The pair of fourth arms include: a pair of fourth bases arranged in a lateral direction of the base frame that is perpendicular to the direction in which the pair of second bases are arranged, and extending from the base frame in the top-bottom direction; and a pair of fourth claws extending, with a bend, from the respective fourth bases in the lateral direction.

The third drive unit rotates the pair of third arms relative to the base frame to change a lateral distance between the third claws.

The fourth drive unit rotates the pair of fourth arms relative to the base frame to change a lateral distance between the fourth claws.

The location of the pair of first claws in the top-bottom direction is the same as a location of the pair of third claws in the top-bottom direction.

The location of the pair of second claws in the top-bottom direction is the same as a location of the pair of fourth claws in the top-bottom direction.

The above-described arrangement allows the first and second heated workpieces to be supported at four locations.
(Arrangement 9)

A hot-press manufacturing line according to an embodiment of the present invention includes: the transportation apparatus of any one of Arrangements 1 to 8; a heating device adapted to heat the first and second workpieces; a stand adapted to allow the first and second heated workpieces heated by the heating device to be placed thereon; at least one press machine including at least two pairs of die parts; and a moving device adapted to move the transportation apparatus between a location above the stand and a pressing location between the die parts of each of the at least two pairs of die parts. One pair of die parts press-form a heated workpiece. The heated workpiece is press-formed by positioning the heated workpiece between a pair of die parts and, in this state, moving the die parts closer to each other. One press machine may be provided with at least two pairs of die parts, or at least two press machines may be provided, each including one pair of die parts.
(Arrangement 10)

The hot-press manufacturing line of Arrangement 9 may further include a tray adapted to allow the first and second workpieces being heated to be placed thereon when the first and second heated workpieces are heated by the heating device. The tray includes: a tray body a sheet-shaped heat storage member placed on the tray body; and a first group of at least three struts extending upwardly from the tray body or the heat storage member. The first group of struts are disposed such that imaginary straight lines connecting the struts form at least one triangle when viewed from above. Alternatively, the tray may include, in lieu of the first group of struts, a projection of the heat storage member protruding upwardly from the heat storage member and allowing the first and second workpieces being heated to be placed thereon. The first group of struts may be fixed to the tray body or the heat storage member.
(Arrangement 11)

The hot-press manufacturing line of Arrangement 9 may further include a tray adapted to allow the first and second workpieces being heated to be placed thereon when the first and second heated workpieces are heated by the heating device. The tray may include; a tray body shaped to expand in a plane perpendicular to the top-bottom direction and having an empty space extending therethrough in the top-bottom direction; and a group of struts extending upwardly from the tray body. The group of struts may include: a first sub-group of at least three struts constructed to be capable of supporting the lower surface of the first workpiece being heated, the first workpiece being heated being sheet-shaped; and a second sub-group of at least three struts constructed to be capable of supporting the lower surface of the second workpiece being heated, the second workpiece being heated being located higher than the first workpiece being heated supported by the first sub-group of struts. The first sub-group of struts are disposed such that imaginary straight lines connecting the struts form at least one triangle when viewed from above. The second sub-group of struts are disposed at locations different from those of the first sub-group of struts when viewed from above such that imaginary straight lines connecting the struts form at least one triangle when viewed from above, and a top of every one of the struts of the second sub-group is located higher than a top of one of the struts of the first sub-group whose top is located lowest. The first and second groups of struts may be fixed to the tray body.

Now, embodiments of the present invention will be described in detail with reference to the drawings. The same or corresponding components in the drawings are labeled with the same reference numerals, and their description will not be repeated. The size ratios of the components shown in the drawings do not necessarily represent their actual size ratios.

Embodiment 1

[Exemplary Construction of Apparatus]

FIG. 1 is a schematic plan view of a hot-press manufacturing line 10 according to an embodiment. The hot-press manufacturing line 10 includes a material table 12, a heating device 14, transportation tables 16 and 17, a press machine 20, manipulators 41, 42 and 44, a transportation apparatus 46, a formed-product table 18, and a controller 22. An end of the transportation table 16 is connected to an outlet 14A of the heating device 14. An end of the transportation table 17 is connected to an inlet 14B of the heating device 14. The material table 12 is located adjacent to the end of the transportation table 17 opposite to that for the heating device 14. The formed-product table 18 is located adjacent to the end of the press machine 20 opposite to the end adjacent to the transportation table 16.
(Material Table, Formed-Product Table)

The material table 12 is a table on which material prior to pressing is placed. For example, a blank 24 prepared by cutting a flat steel sheet into a predetermined shape is positioned on the material table 12. The formed-product table 18 is a table on which a press-formed product is placed. For example, a press-formed product that has been press-formed by the press machine 20 is placed on the formed-product table 18.
(Heating Device)

The heating device 14 heats an object to be heated (i.e., workpiece). The heating device 14 may be, for example, a resistance heating furnace, a gas heating furnace, a far-infrared heating furnace, or a near-infrared heating furnace. The heating device 14 is not limited to a heating furnace, and may be a high-frequency induction heating device, a low-frequency induction heating device, or an electrical heating device that causes electricity to directly flow through the object to be heated to heat the object. The heating device 14 may include a heating chamber. The heating device 14 may include, inside the heating chamber, a plurality of in-chamber rollers that are driven by a driving mechanism, not shown, and rotate. Rotating the in-chamber rollers transports the object being heated on the in-chamber rollers.

(Transportation Tables)

The transportation tables 16 and 17 each include a plurality of transportation rollers 26 that are driven by a driving mechanism, not shown, and rotate. As the transportation rollers 26 rotate in synchronization with the in-chamber rollers, the object being transported (i.e., workpiece (to be) heated) is transported between the transportation table 16, 17 and the interior of the heating chamber of the heating device 14. The transportation rollers 26 are spaced apart from one another. The transportation table 16 is an example of a stand on which a heated workpiece heated by the heating device is placed. The transportation table 16 is also an example of a transportation path along which the heated workpiece is transported from the heating device to the lifting location. In the present implementation, a location above the transportation table 16 represents the lifting location for the heated workpiece by the transportation apparatus 46. It will be understood that the construction of the transportation path is not limited to the transportation table 16 shown in FIG. 1. For example, the transportation path may be a belt conveyor, rails, or the like. Further, although the lifting location is on the transportation path in the implementation shown in FIG. 1, the lifting location need not be on the transportation path. A stand that provides a lifting location may be provided separately from the transportation path.

(Press Machine)

The press machine 20 includes a lower die part and an upper die part for press-forming an object to be pressed. By way of example, the lower die part is constituted by a punch; by way of example, the upper die part is constituted by a die block. Channels for coolant may be provided in the upper and lower die parts. Thus, heat taken from the object being pressed during pressing may be released by means of coolant. Two heated workpieces may be positioned between the upper and lower die parts. The upper and lower die parts are movable relative to each other. With two heated workpieces positioned between the upper and lower die parts, the press machine 20 moves the upper and lower die parts closer to each other to press-form the two heated workpieces. The operation of the upper and lower die parts may be controlled by the controller 22, for example. In the present implementation, the lower and upper die parts of the press machine 20 are shaped so as to simultaneously produce a plurality of press-formed products. In this implementation, two pairs of die parts are provided in one press machine. In the present implementation, a plurality of workpieces are positioned between the lower and upper die parts of the press machine 20 such that the plurality of workpieces are pressed simultaneously. A plurality of press machines may be provided. For example, two press machines may be provided, each including one pair of die parts.

(Manipulator)

The manipulator 44 uses the transportation apparatus 46 to transport the object being transported from the transportation table 16 to the press machine 20. The transportation apparatus 46 operates by lifting a workpiece, i.e., object being transported, holding it, and placing it on a surface. The manipulator 44 controls the location and attitude of the transportation apparatus 46. The transportation apparatus 46 may be an end effecter of the manipulator 44. The manipulator 44 moves the transportation apparatus 46 between a location above the transportation table 16 and a location between the die parts (i.e., upper and lower die parts) of each of the two pairs of die parts in the press machine 20. The manipulator 44 includes a base rotatable about at least one axis and an arm extending from the base and having at least one joint. The transportation apparatus 46 is rotatably mounted on the distal end of the arm. A moving device for moving the transportation apparatus 46 is not limited to a manipulator. For example, a moving device may include rails connecting the transportation table 16 and press machine 20 and a suspension device for suspending the transportation apparatus 46 above the rails and moving it up and down. The implementation shown in FIG. 1 also includes a manipulator 41 for moving a workpiece from the material table 12 to the transportation table 17 and a manipulator 42 for transporting a workpiece out of the press machine 20 and placing the workpiece on the formed-product table 18.

(Controller)

The Controller 22 controls the heating device 14, transportation tables 16 and 17, press machine 20, and manipulators 41, 42 and 44. The controller 22 is constituted by a control system including at least one computer, for example. By way of example, the controller 22 may include control units (constituted by, for example, circuits or processors) distributed among the heating device 14, transportation tables 16 and 17, manipulators 41, 42 and 44, and press machine 20 for controlling these devices. In such implementations, the controller 22 may include an overall-control computer that supplies the control units of the various devices with control information to control the operation of the entire hot-press manufacturing line 10. The operation of the arms of the transportation apparatus 46, described further below, may be controlled by part of the controller 22, such as the control unit of the manipulator 44.

(Transportation Apparatus)

Figure 2A:
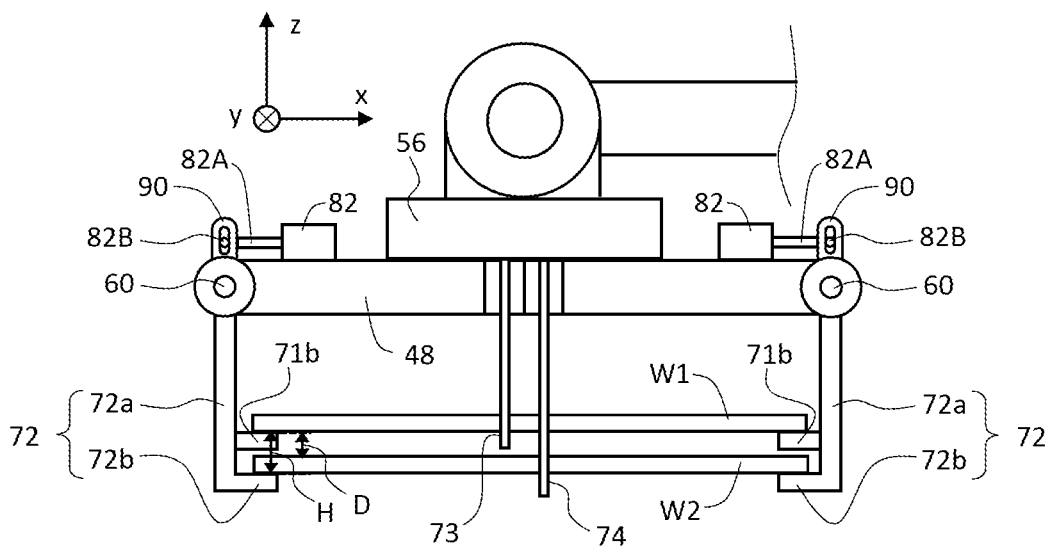
FIG. 2A is a side view of an exemplary construction of the transportation apparatus of FIG. 1 as viewed in the y-direction.
Figure 2B:
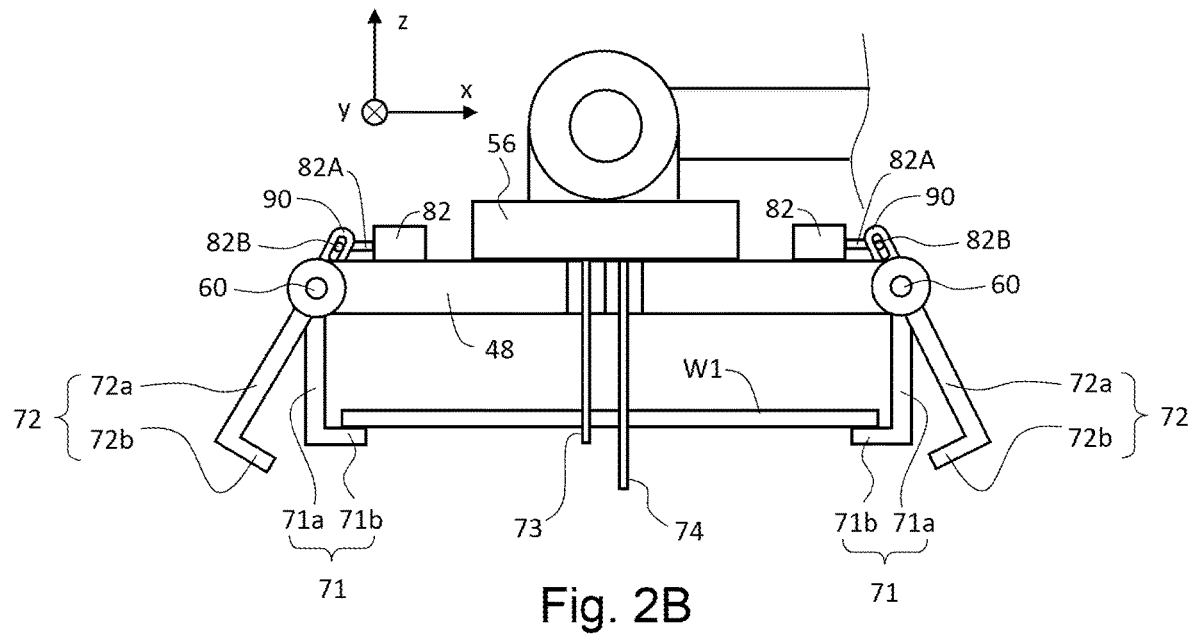
FIG. 2B shows the transportation apparatus of FIG. 2A with its second arms 72 opened outwardly.
Figure 3:
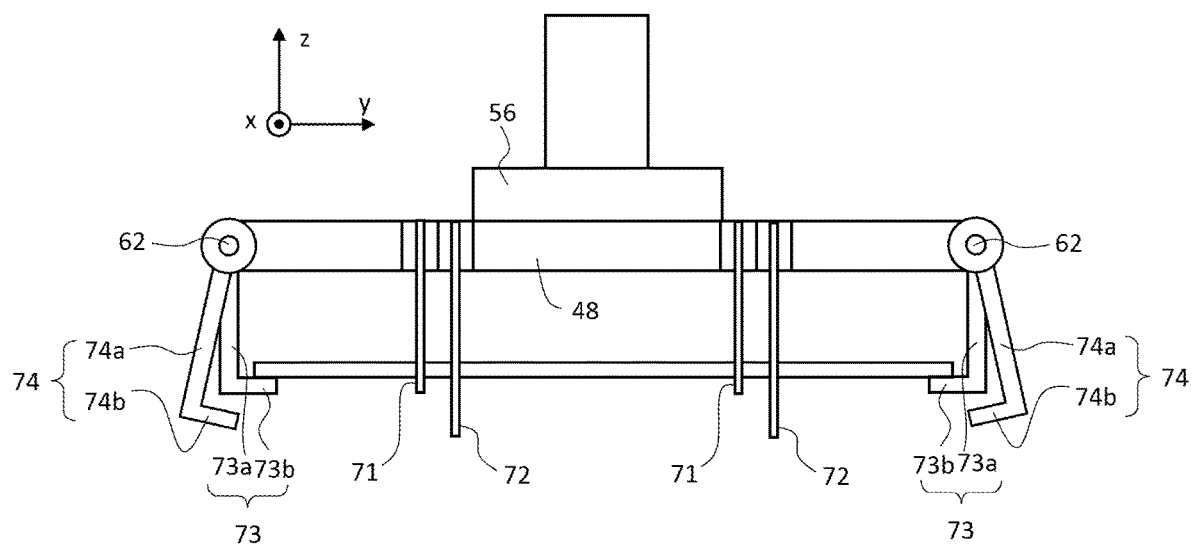
FIG. 3 is a side view of the exemplary construction of the transportation apparatus of FIG. 1 as viewed in the x-direction.

FIG. 2A is a side view of an exemplary construction of the transportation apparatus 46 of FIG. 1 as viewed in a lateral direction (y-direction). FIG. 2B shows the transportation apparatus 46 of FIG. 2A with its second arms 72 opened outwardly. FIG. 3 is a side view of the exemplary construction of the transportation apparatus 46 of FIG. 1 as viewed in another lateral direction (x-direction).

(Base Frame)

In the implementation shown in FIGS. 2A and 2B, the transportation apparatus 46 includes a base frame 48, as well as a pair of first arms 71 and a pair of second arms 72 rotatably mounted on the base frames 48. The shape of the base frame 48 is rectangular when viewed from above (see FIG. 1). In the present implementation, the top-bottom direction represents the z-direction. A lateral direction is a direction in a plane perpendicular to the top-bottom direction. Lateral directions include the long-length direction of the base frame 48, i.e., y-direction, and the short-length direction, i.e., x-direction.

A joint 56 is provided on the upper surface of the base frame 48 to be connected to the manipulator 44. The joint 56 is connected to the manipulator such that the base frame 48 is rotatable, about an axis in the top-bottom direction, relative to the manipulator 44.

(First and Second Arms)

The pair of first arms 71 are separated from each other in a lateral direction (x-direction). Each of the first arms 71 includes a first base 71a extending from the base frame 48 in the top-bottom direction, and a first claw 71b extending, with a bend, from the first base 71a in the lateral direction. Each first arm 71 is mounted on the base frame 48 so as to be rotatable about an axis of rotation 60 in the y-direction.

One end of the first base 71*a* is rotatably connected to the base frame 48, while the first claw 71*b* extends from the other end.

The pair of second arms 72 are separated from each other in a lateral direction (x-direction). Each of the second arms 72 includes a second base 72*a* extending from the base frame 48 in the top-bottom direction, and a second claw 72*b* extending, with a bend, from the second base 72*a* in the lateral direction. Each second arm 72 is mounted on the base frame 48 so as to be rotatable about an axis of rotation 60 in the y-direction. One end of the second base 72*a* is rotatably connected to the base frame 48, while the second claw 72*b* extends from the other end.

The location of the pair of first claws 71*b* in the top-bottom direction and the location of the pair of second claws 72*b* in the top-bottom direction are different from each other. In the implementation shown in FIGS. 2A and 2B, the first bases 71*a* are shorter than the second bases 72*a* as measured in the top-bottom direction. The first claws 71*b* are located closer to the base frame 48 than the second claws 72*b* are.

The pair of first claws 71*b* are preferably spaced apart from the pair of second claws 72*b* by a distance of 0 to 50 mm plus the maximum sheet thickness of a second heated workpiece W2 supported by the second claws 72*b* located lower in the top-bottom direction. In other words, the distance D between a first heated workpiece W1 supported by the first claws 71*b* and a second heated workpiece W2 supported by the second claws 72*b* is preferably 0 to 50 mm. For example, if the sheet thickness of the second heated workpiece W2 varies by about 1 to 3 mm within the second heated workpiece W2, the distance H between the pair of first claws 71*b* and the pair of second claws 72*b* in the top-bottom direction is preferably 3 to 53 mm (i.e., the distance D plus the maximum sheet thickness of 3 mm of the second heated workpiece W2). As used herein, distance H means the distance between the first and second claws 71*b* and 72*b* as found when the pair of first claws 71*b* support the lower surface of the first heated workpiece and the pair of second claws 72*b* support the lower surface of the second heated workpiece. The distance H is the distance between the uppermost point of the first claws 71*b* and the uppermost point of the second claws 72*b* in the top-bottom direction.

The smaller the distance D (distance H), the better to reduce temperature drop by allowing the first heated workpiece W1 placed on the pair of first claws 71*b* and the second heated workpiece W2 placed on the pair of second claws 72*b* to receive heat radiation from each other. The distance D is more preferably not larger than 30 mm, yet more preferably not larger than 20 mm, and still more preferably not larger than 10 mm.

There may be regions with a distance D of zero. That is, at least part of the first heated workpiece W1 supported by the first claws 71*b* and at least part of the second heated workpiece W2 supported by the second claws 72*b* may be in contact with each other (specific examples will be described further below). Further, as in the exemplary implementation of FIG. 2A, the first claws 71*b* supporting the first heated workpiece W1 may be inserted between the first heated workpiece W1 and the second heated workpiece W2 supported by the second claws 72*b*. In such implementations, for example, the lower limit for the thickness of the claws may represent the lower limit for the distance D. The lower limit for the thickness of the claws depends on the required strength of the claws. In view of this, a lower limit for the distance D is preferably 3 mm, and more preferably 5 mm, for example.

In the implementation shown in FIGS. 2A and 2B, the axis of rotation 60 of each first arm 71 is coaxial with the axis of rotation 60 of the associated second arm 72. This allows the first and second arms 71 and 72 to be efficiently positioned on the base frame 48. Alternatively, the axis of rotation 60 of each first arm 71 and the axis of rotation 60 of the associated second arm 72 may not be coaxial.

(Drive Units)

The pair of second arms 72 are driven by a second drive unit. The second drive unit rotates the pair of second arms 72 relative to the base frame 48 to change the distance between the second claws 72*b* in a lateral direction (x-direction). In the implementation shown in FIGS. 2A and 2B, the second drive unit is constituted by actuators 82 provided for the respective second arms 72.

An actuator 82 may be an air cylinder, for example. The actuator 82 adjusts the amount of extension of an actuation shaft 82A that moves in the axial direction. A pin 82B is provided on the distal end of the actuation shaft 82A. The pin 82B is inserted into a slot in a link 90 fixed to the associated second arm 72 so as to be movable and rotatable.

When each actuator 82 extends its actuation shaft 82A, the associated second arm 72 extends downwardly, as shown in FIG. 2A, such that the pair of second claws 72*b* of the pair of second arms 72 are located closer to each other, i.e., in a closed state. When each actuator 82 retracts its actuation shaft 82A, the pair of second claws 72*b* of the pair of second arms 72 move away from each other, as shown in FIG. 2B, such that they are in an open state.

The pair of first arms 71 are driven by a first drive unit. The first drive unit rotates the pair of first arms 71 relative to the base frame 48 to change the distance between the first claws 71*b* in a lateral direction (x-direction). The first drive unit that drives the first arms 71 may be an arrangement including actuators similar to the actuators 82 shown in FIGS. 2A and 2B, for example. The pair of first arms 71 are controlled by the first drive unit to be, again, in a closed state, in which the pair of first claws 71*b* are located closer to each other (see FIG. 2A), or in an open state, in which the pair of first claws 71*b* are more distant from each other than in the closed state. It will be understood that the actuators of the first and second drive units are not limited to air cylinders, and may be motors or hydraulic cylinders, for example.

The pair of first claws 71*b* are capable of supporting the lower surface of the first heated workpiece W1 at both ends as determined along the lateral direction when they are laterally closer to each other, i.e., in the closed state. The pair of second claws 72*b* are capable of supporting the lower surface of the second heated workpiece W2 at both ends as determined along the lateral direction when they are laterally closer to each other, i.e., in the closed state.

(Third and Fourth Arms)

In the implementation shown in FIGS. 2A, 2B and 3, a pair of third arms 73 and a pair of fourth arms 74 are rotatably mounted on the base frame 48. Further, although not shown, a third drive unit for driving the pair of third arms 73 and a fourth drive unit for driving the pair of fourth arms 74 are provided on the base frame 48. FIG. 3 does not show the first to fourth drive units.

The pair of third arms 73 are arranged in the y-direction, i.e., direction perpendicular to the direction in which the pair of first arms 71 are arranged (i.e., x-direction) (see FIG. 3). Each third arm 73 is mounted on the base frame 48 so as to be rotatable about an axis of rotation 62 in the direction perpendicular to the axes of rotation 60 of the first arms (i.e., x-direction). Each third arm 73 may have the same construction as a first arm 71. Each third arm 73 includes a third base 73a and a third claw 73b. The pair of third claws 73b and the pair of first claws 71b support the lower surface of the first heated workpiece W1. In the present implementation, the distance between the third claws 73b and base frame 48 is substantially equal to that for the first claws 71b. In this implementation, the first heated workpiece W1 is a flat sheet.

The pair of fourth arms 74 are arranged in the y-direction, i.e., direction perpendicular to the direction in which the pair of second arms 72 are arranged (i.e., x-direction) (see FIG. 3). Each fourth arm 74 is mounted on the base frame 48 so as to be rotatable about an axis of rotation 62 in the direction perpendicular to the axes of rotation 60 of the second arms (i.e., x-direction). Each fourth arm 74 may have the same construction as a second arm 72. Each fourth arm 74 includes a fourth base 74a and a fourth claw 74b. The pair of fourth claws 74b and the pair of second claws 72b support the lower surface of the second heated workpiece W2. In the present implementation, the distance between the fourth claws 74b and base frame 48 is substantially equal to that for the second claws 72b. In this implementation, the second heated workpiece W2 is a flat sheet.

(Control Systems)

Figure 4:
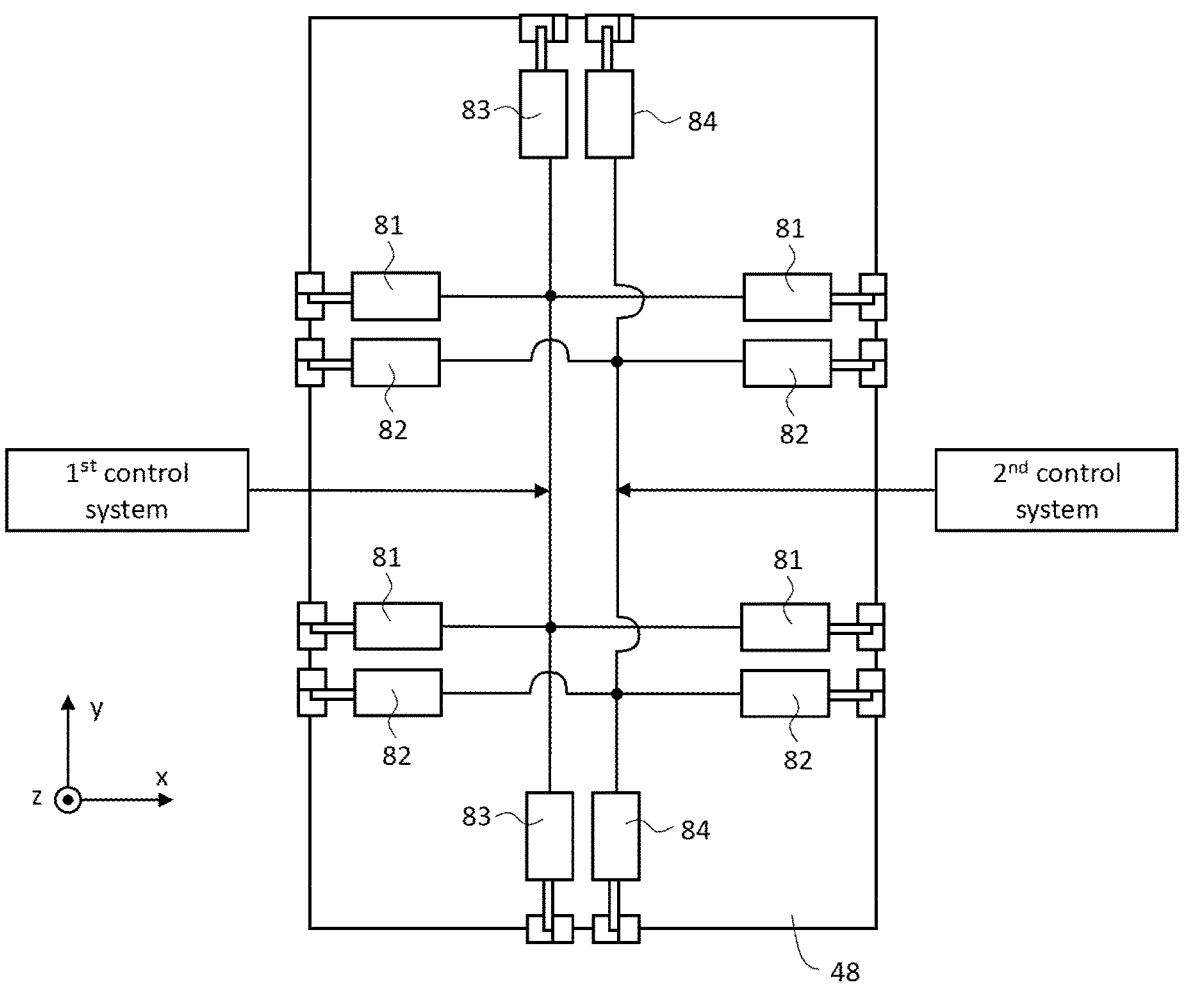
FIG. 4 illustrates an exemplary set of control systems for the first to fourth drive units.

FIG. 4 illustrates an exemplary set of control systems for the first to fourth drive units. FIG. 4 shows an exemplary arrangement of the first to fourth drive units on the base frame 48. In the implementation shown in FIG. 4, four actuators 81 for the first drive unit, four actuators 82 for the second drive unit, two actuators 83 for the third drive unit, and two actuators 84 for the fourth drive unit are disposed on the upper surface of the base frame. The actuators 81 and 83 for the first and third drive units are controlled by the first control system. The actuators 82 and 84 for the second and fourth drive units are controlled by the second control system.

For example, the actuators 81 and 83 are controlled by the same control signals, and the actuators 82 and 84 are controlled by the same control signals. In implementations where the actuators 81 to 84 are air cylinders, the actuators 81 and 83 may share common control valves, and the actuators 82 and 84 may share common control valves, for example.

In the above-described arrangement, the first arms 71 and the second arms 72 are driven by different systems. That is, the rotation of the first arms 71, on the one hand, and the rotation of the second arms 72, on the other, are controlled independently. Further, the third arms 73 and the fourth arms 74 are driven by different systems. The first and third arms 71 and 73 are driven by the same system. The second and fourth arms 72 and 74 are driven by the same system. Alternatively, the first arms 71 and the third arms 73 may be driven by different systems, and the second arms 72 and the fourth arms 74 may be driven by different systems.

[Exemplary Process for Manufacturing Press-Formed Product]

An exemplary process for manufacturing a press-formed product using the above-described hot-press manufacturing line 10 will be described. The process for manufacturing a press-formed product according to the present embodiments include: a heating step in which workpieces are heated; a transportation step in which the heated workpieces are transported; and a pressing step in which the heated workpieces are pressed.

(Heating Step)

Figure 5:
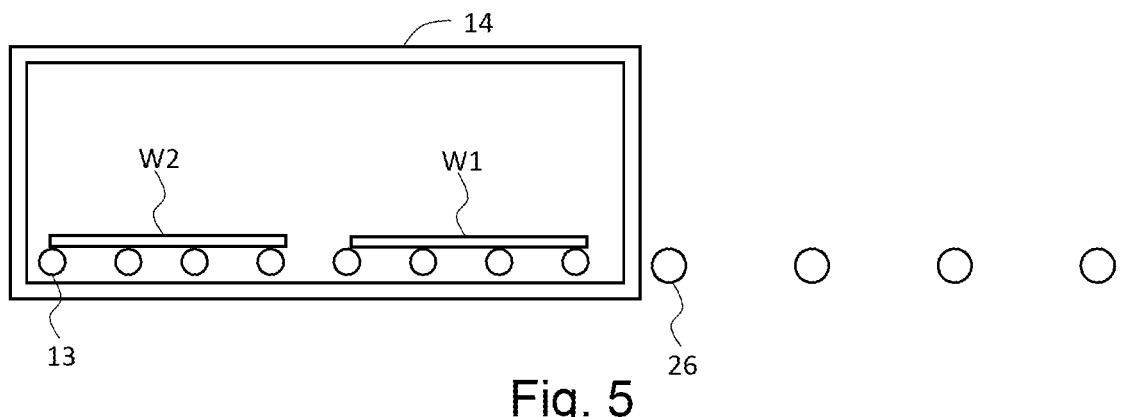
FIG. 5 illustrates the heating step.

FIG. 5 illustrates the heating step. During the heating step, the heating device 14 heats at least two sheet-shaped workpieces W1 and W2 simultaneously. The simultaneous heating of a plurality of workpieces only requires that the heating of the plurality of workpieces be terminated simultaneously; the heating need not be initiated simultaneously. Further, the scope of simultaneous heating of a plurality of workpieces includes implementations where the heating of a plurality of workpieces is terminated exactly at the same time and, in addition, implementations where the heating of one workpiece and the heating of another are terminated at slightly different points of time. For example, even if there is a difference in time equivalent to the time required for the transportation apparatus 46 to lift a heated workpiece, the heating can be considered to occur substantially at the same time from the viewpoint of temperature drop in the workpieces during transportation. The heated workpieces for which heating has ended are moved out of the heating device 14 through the rotation of the rollers 13 in the heating device 14 and the transportation rollers 26 on the transportation table 16.

(Transportation Step)

The transportation step includes: a sub-step in which the transportation apparatus 46 lifts the first heated workpiece W1; a sub-step in which the transportation apparatus 46 lifts the second heated workpiece W2; a sub-step in which the first and second heated workpieces W1 and W2 are transported; a sub-step in which the first heated workpiece W1 is lowered to a pressing location; and a sub-step in which the second heated workpiece W2 is lowered to a pressing location.

Figure 6:
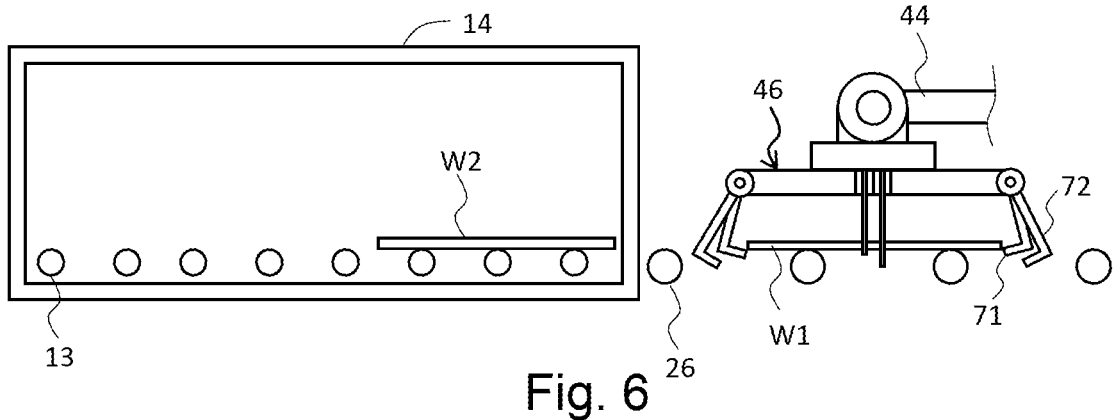
FIG. 6 illustrates the step in which the first heated workpiece is lifted by the transportation apparatus.

FIG. 6 illustrates the sub-step in which the transportation apparatus 46 lifts the first heated workpiece W1. The pair of first arms 71 rotatably mounted on the base frame of the transportation apparatus 46 are driven such that the claws of the pair of first arms 71 support the lower surface of the first heated workpiece W1 at both ends and lift the workpiece. To do this, the pair of first arms 71 and the pair of second arms 72 are brought into the open state, and the transportation apparatus 46 is lowered so as to be closer to the first heated workpiece W1 on the transportation rollers 26 on the transportation table 16. As the pair of first arms 71 are rotated into the closed state, the first claws of the pair of first arms 71 "dive" to below the lower surface of the first heated workpiece W1 at both ends. In this state, the transportation apparatus 46 is lifted such that the first claws of the pair of first arms 71 support and lift the lower surface of the first heated workpiece W1 at both ends and lift the workpiece.

Figure 7:
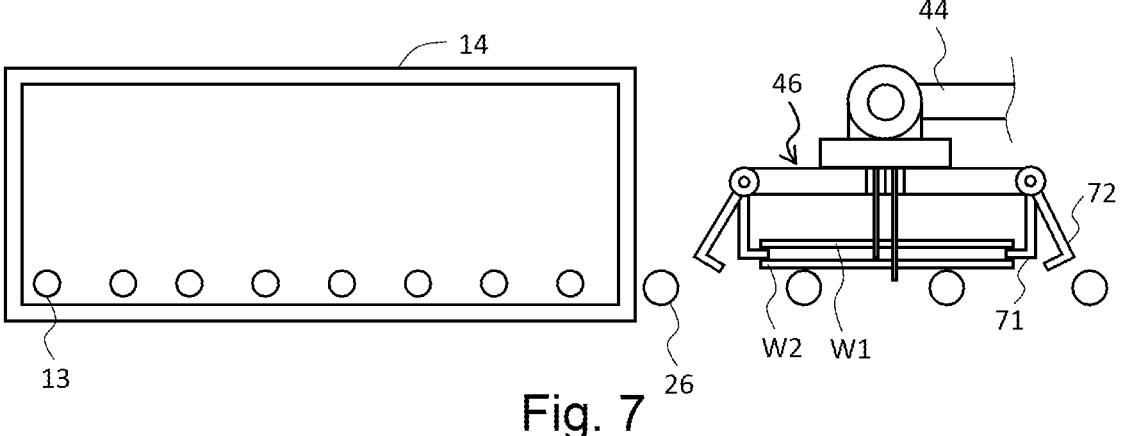
FIG. 7 illustrates the step in which the second heated workpiece is lifted by the transportation apparatus.

FIG. 7 illustrates the sub-step in which the transportation apparatus 46 lifts the second heated workpiece W2. With the lower surface of the first heated workpiece W1 supported and held by the pair of first arms 71, the transportation apparatus 46 drives the pair of second arms 72 to lift the second heated workpiece W2. In a manner similar to the lifting operation for the first heated workpiece W1, the transportation apparatus 46 uses the claws of the pair of second arms 72 to support the lower surface of the second heated workpiece W2 at both ends and lift the workpiece.

Figure 8:
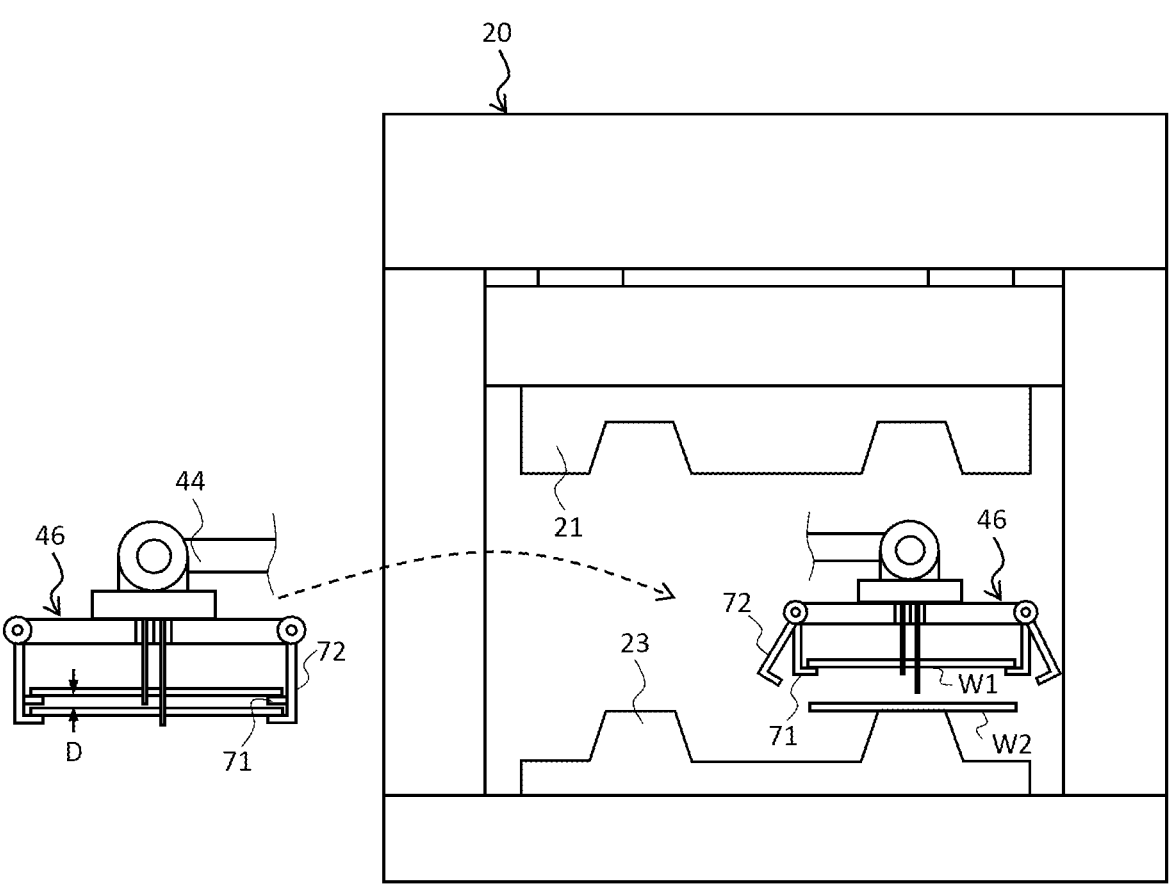
FIG. 8 illustrates the step in which the workpiece is transported and positioned at a pressing location.

FIG. 8, toward the left, illustrates how the transportation apparatus 46 transports the first and second heated workpieces W1 and W2. The transportation apparatus 46 transports the first heated workpiece W1 with its lower surface supported by the claws of the pair of first arms 71, and the second heated workpiece W2 with its lower surface supported by the claws of the pair of second arms 72, where the workpieces overlap each other in the direction normal to the sheet surfaces of the first heated workpiece W1.

In the transportation step, it is preferable that the distance D between the first heated workpiece W1 supported by the pair of first arms 71 and the second heated workpiece W2 supported by the claws of the pair of second arms 72 as measured in the direction normal to the sheet surfaces of the first heated workpiece W1 is 0 to 50 mm. The smaller the distance D, the better to reduce temperature drop by allowing the first heated workpiece W1 placed on the pair of first claws 71b and the second heated workpiece W2 placed on the pair of second claws 72b to receive heat radiation from each other, and to produce the temperature-retaining effect of air warmed by heat transfer from the first and second heated workpieces W1 and W2 and staying between these workpieces. The distance D is more preferably not larger than 30 mm, yet more preferably not larger than 20 mm, and still more preferably not larger than 10 mm. There may be regions with a distance D of zero. Further, the lower limit for the thickness of the claws may represent the lower limit for the distance D, for example. In view of this, a lower limit for the distance D is preferably 3 mm, and more preferably 5 mm, for example.

The distance D is equivalent to a value obtained by subtracting the thickness of the second heated workpiece W2 from the distance H between the first claws 71b of the first arms 71 and the second claws 72b of the second arms 72 as measured in the top-bottom direction. If the sheet thickness of at least one of the first and second heated workpieces W1 and W2 is not uniform, the maximum distance, in the normal direction, between the first and second heated workpieces W1 and W2 in the region where they overlap when viewed from above is treated as the distance D. The distance D (mm) and the minimum sheet thickness t (mm) of the thinnest portion of the first and second heated workpieces W1 and W2 is preferably in the relationship of D≤60t, and more preferably D≤40t.

FIG. 8, toward the right, illustrates how the transportation apparatus 46 lowers the second heated workpiece W2 to a pressing location. The transportation apparatus 46 moves to the pressing location for the second heated workpiece W2. While continuing to support and hold the lower surface of the first heated workpiece W1 with the pair of first arms 71, the transportation apparatus 46 drives the pair of second arms 72 into the open state, and lowers the second heated workpiece W2 to the pressing location in the press machine 20. Thereafter, the transportation apparatus 46 moves to the pressing location for the first heated workpiece W1, drives the pair of first arms 71 into the open state, and lowers the first heated workpiece W1 to the pressing location in the press machine.

In the implementation shown in FIG. 8, two workpieces are positioned between the upper die part 21 and lower die part 23 of one press machine and the two workpieces are pressed simultaneously. In such implementations, the first and second heated workpieces W1 and W2 are lowered to different pressing locations between the upper and lower die parts 21 and 23. The lowering, by the transportation apparatus 46, of the two heated and held workpieces to the respective pressing locations is not limited to this manner. For example, in some implementations, the first and second heated workpieces W1 and W2 may be lowered to respective pressing locations in two press machines.

In the implementation shown in FIG. 8, the second heated workpiece W2 has been lowered onto a pressing location on the lower die part 23 and is positioned so as to be in contact with the top of the lower die part 23. The positioning of the first and second heated workpieces W1 and W2 on the lower die part 23 is not limited to this manner. For example, although not shown, a plunger pin, for example, may be provided at a location on the lower die part 23 where a heated workpiece is to be positioned, and the heated workpiece is positioned on the plunger pin. That is, the heated workpiece thus supported may be located slightly higher than the upper surface, i.e., pressing surface, of the lower die part 23, and held so as to be "floating" above the pressing surface. This prevents the heated workpiece from being continuously in contact with the lower die part 23 from the time when the heated workpiece is positioned on the lower die part until forming of the heated workpiece is started by the upper and lower die parts 21 and 23. This prevents the temperatures of some portions of the heated workpiece, prior to the beginning of forming, from significantly decreasing against one's intention. Generally, a plunger pin has a small contact area with a heated workpiece; thus, even though the plunger pin is continuously in contact with the heated workpiece, the temperature of the heated workpiece does not significantly decrease. Further, when a force is applied to the plunger pin by the upper die part 21 via the heated workpiece, the plunger pin is immediately retracted into the lower die part 23; thus, there are no impediments to press-forming of the heated workpiece. The plunger pin is a movable projection that, when a heated workpiece is positioned thereon, protrudes upward from the upper surface, i.e., pressing surface, of the lower die part 23, and can be retracted into the lower die part 23 when the die is at the bottom-dead point. The positioning of the heated workpiece with a distance from the pressing surface of the lower die part 23 is not limited to arrangement with a movable projection. For example, a cushion or the like may be provided on the press machine 20 to hold the heated workpiece, prior to forming, at a location that is not in contact with the lower die part 23 nor the upper die part 21.

[Material of Heated Workpiece]

The material of a heated workpiece is any formable metal. Although not limiting, examples of materials for a heated workpiece include Fe-based materials such as carbon steel or stainless steel, and Al-based and Ti-based materials. Further, the heated workpiece may include a plating layer. For example, the heated workpiece may be a plated steel sheet. The plating layer may be a plating layer of, for example, an aluminum alloy, an aluminum-based alloy, a zinc alloy, or a zinc-based alloy.

A heated workpiece constituted by a plated steel sheet is preferable in that oxide scale is not easily produced during transportation. If upper and lower overlapping heated workpieces W1 and W2 are transported by the transportation apparatus 46 and, during this, oxide scale is formed on the lower surface of the upper heated workpiece W1, this oxide scale may peel off and drop onto the upper surface of the lower heated workpiece W2. Further, oxide scale formed on the lower surface of the lower heated workpiece W2 may peel off, too. In such cases, the difference between the amounts of oxide scale adhering to the upper and lower surfaces of the lower heated workpiece W2 may be larger than the corresponding difference for the upper heated workpiece W1. A difference in the amount of adhering scale may lead to differences in frictional characteristics of the die and workpiece surface during press-forming. As a result, separate adjustments to the die and separate settings of forming conditions may be needed for each heated workpiece. If the heated workpiece is a plated steel sheet, formation of oxide scale during transportation can be prevented, thereby reducing variations in characteristics of heated workpieces.

[Effects of Transportation of Plurality of Heated Workpieces Separated with Distance]

In the above-described implementations, first and second heated workpieces W1 and W2 separated in the top-bottom direction and overlapping each other are transported by the transportation apparatus 46. This reduces variations in characteristics of a heated workpiece as represented by the differences between the upper and lower surfaces, and variations in characteristics of the upper and lower surfaces as represented by the differences between the upper and lower heated workpieces.

If the first and second heated workpieces W1 and W2 overlapping with no clearance therebetween are transported, the overlying surfaces of the workpieces, on the one hand, and the opposite surfaces of the workpieces, on the other, are in contact with air for different periods of time. In such cases, if the first and second heated workpieces W1 and W2 are non-plated sheets, the upper and lower surfaces of each workpiece may develop different amounts of oxide scale. If the upper and lower surfaces have different amounts of oxide scale, the upper and lower surfaces may have different frictional characteristics. Further, the overlying surface and the opposite surface of the first workpiece W1 are in reversed up-down orientations compared with those of the second workpiece W2; thus, the first and second workpieces W1 and W2 themselves may have different frictional characteristics. As a result, adjustments to the die and settings of forming conditions for press-forming may require increased time. In view of this, transporting the first and second heated workpieces W1 and W2 separated with a distance reduces variations in frictional characteristics of the upper and lower surfaces of the heated workpieces.

[Variations]

(Shape of Heated Workpiece)

The shape of a heated workpiece is not limited to a flat sheet in the above-described implementations. A heated workpiece may be an intermediate formed product that has been press-formed. Further, the first and second workpieces W1 and W2 need not have the same shape or size.

Figure 9:
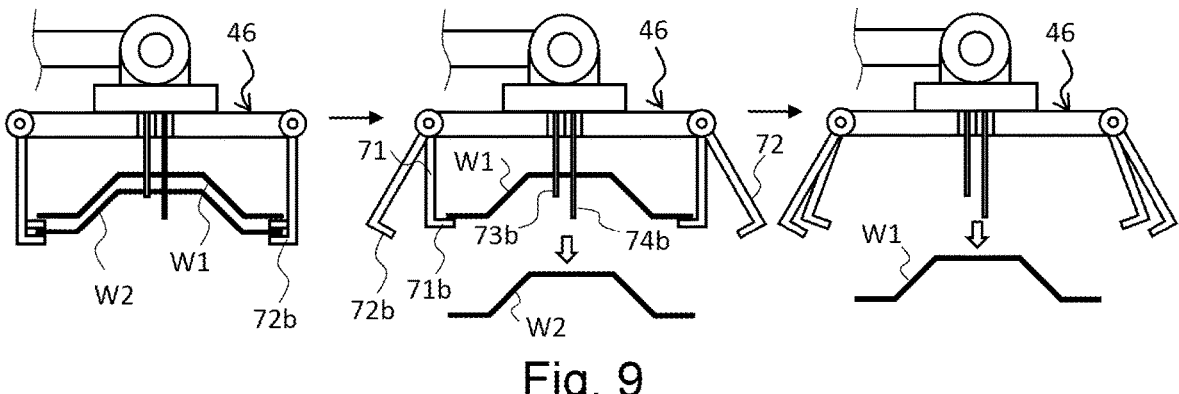
FIG. 9 illustrates an implementation where the first and second heated workpieces are intermediate formed products.

FIG. 9 illustrates an implementation where the first and second heated workpieces W1 and W2 are intermediate formed products. In the implementation shown in FIG. 9, the location of the first claws 71b of the first arms 71 as determined along the top-bottom direction is different from that for the third claws 73b of the third arms 73. The positional relationship between the first claws 71b and the third claws 73b depends on the shape of the intermediate formed product. The first and third claws 71b and 73b are thus constructed to support the lower surface of the first heated workpiece W1. Further, the location of the second claws 72b of the second arms 72 as determined along the top-bottom direction is different from that for the fourth claws 74b of the fourth arms 74. The positional relationship between the second claws 72b and the fourth claws 74b depends on the shape of the intermediate formed product. The second and fourth claws 72b and 74b are thus constructed to support the lower surface of the second heated workpiece W2.

Figure 10:
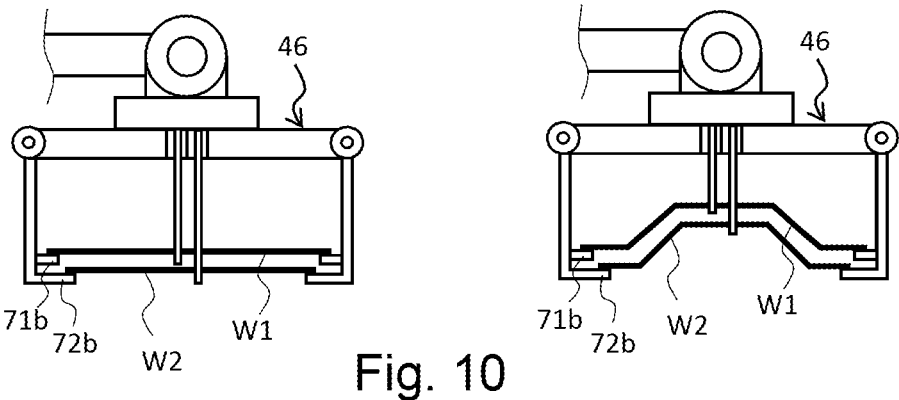
FIG. 10 illustrates implementations where the first and second heated workpieces have different sizes.

FIG. 10 illustrates implementations where the first and second heated workpieces W1 and W2 have different sizes. In the implementations shown in FIG. 10, the amount of laterally inward protrusion of the first claws 71b found when the pair of first arms 71 support the first heated workpiece W1 is different from the amount of laterally inward protrusion of the second claws 72b found when the pair of second arms 72 support the second heated workpiece W2. Thus, amounts of protrusion of the first and second claws 71b and 72b can be decided upon based on the sizes (i.e., sheet surface areas) of the heated workpieces. The left drawing in FIG. 10 shows an exemplary construction of the transportation apparatus 46 for transporting heated workpieces that are flat sheets, while the right drawing in FIG. 10 shows an exemplary construction of the transportation apparatus 46 for transporting an intermediate formed products that do not have the shape of a flat sheet.

Figure 11:
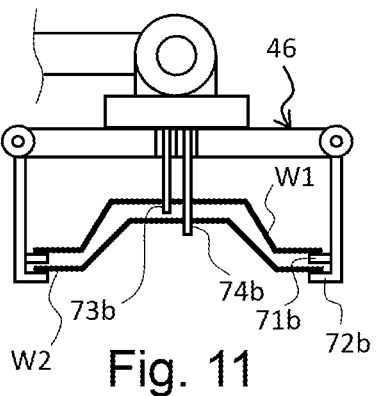
FIG. 11 illustrates an implementation where the first and second heated workpieces have different shapes.

FIG. 11 illustrates an implementation where the first and second heated workpieces W1 and W2 have different shapes. In the implementation shown in FIG. 11, the locations of the first claws 71b of the first arms 71 and the locations of the third claws 73b of the third arms 73 accommodate the shape of the first heated workpiece W1. The locations of the second claws 72b of the second arms 72 and the locations of the fourth claws 74b of the fourth arms 74 accommodate the shape of the second heated workpiece W2.

(Shields)

Figure 12:
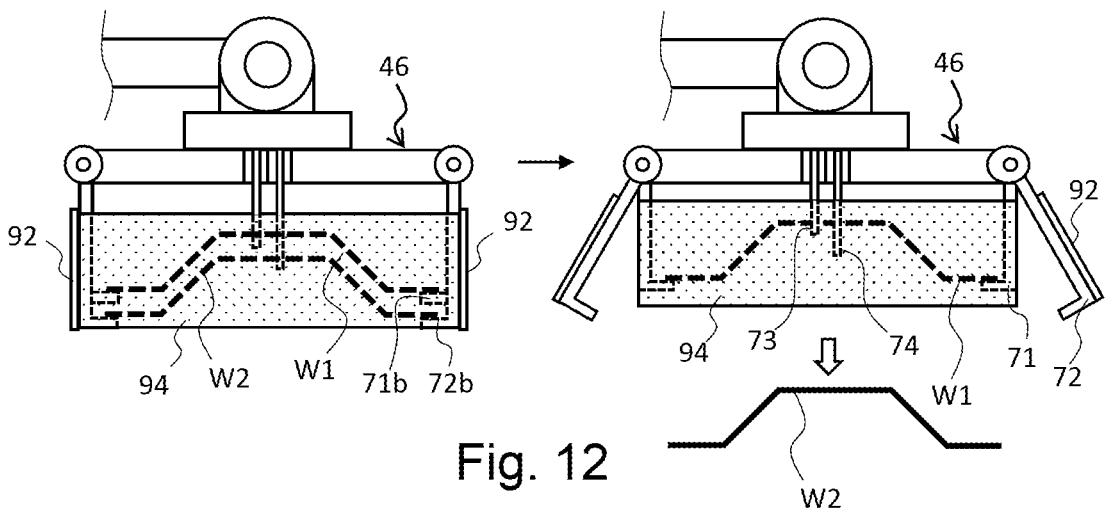
FIG. 12 illustrates an implementation with shields on the transportation apparatus.

The transportation apparatus 46 may further include side shields that cover both the pair of first claws 71b and the pair of second claws 72b from the sides. FIG. 12 illustrates an implementation with side shields on the transportation apparatus. In the implementation shown in FIG. 12, the side shields 92 are mounted on the apparatus to be located laterally outward of the second arms 72. The side shields 94 are mounted on the apparatus to be located laterally outward of the fourth arms 74. In this implementation, the side shields are located laterally outward of those ones of the plurality of arms which have claws that are located lowest.

Figure 13:
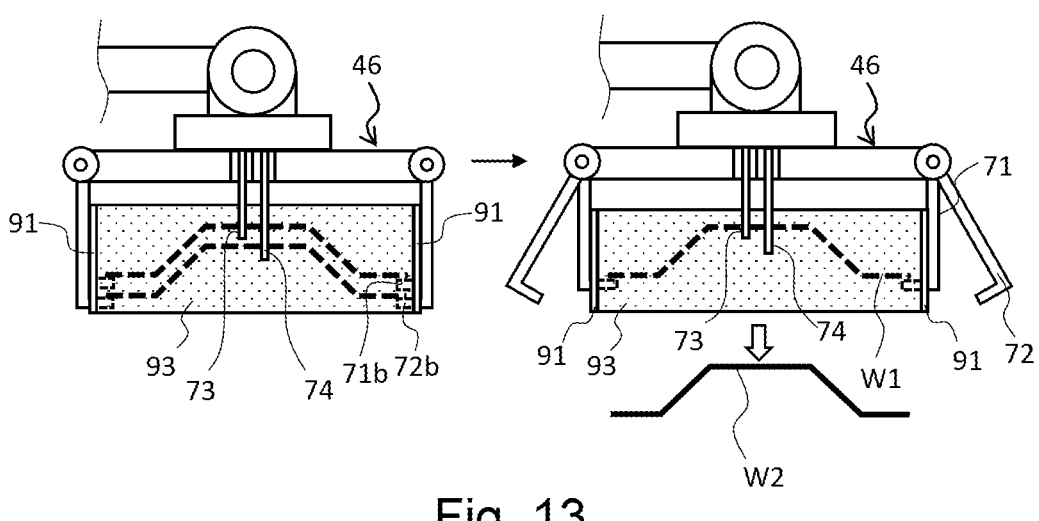
FIG. 13 illustrates another implementation with shields on the transportation apparatus.

FIG. 13 illustrates another implementation with side shields on the transportation apparatus 46. In the implementation shown in FIG. 13, the side shields 91 are mounted on the apparatus to be located laterally inward of the first arms 71. The side shields 93 are mounted on the apparatus to be located laterally inward of the third arms 73. In this implementation, the side shields are located laterally inward of those ones of the plurality of arms which have claws that are located highest.

The side shields 91 to 94 are positioned so as to cover the first and second heated workpieces W1 and W2 and the space defined therebetween from the sides when the first and second arms 71 and 72 support the first and second heated workpieces W1 and W2, respectively. Thus, during transportation, the side shields prevent outside air from entering the space between the first and second heated workpieces W1 and W2 and thus prevent existing air between the first and second heated workpieces W1, warmed by heat transfer from these heated workpieces, from exiting the space between the heated workpieces. This retains the temperature-retaining effect of air warmed by and staying between the first and second heated workpieces W1 and W2, thereby further reducing temperature drop in the heated workpieces during transportation.

Figure 14:
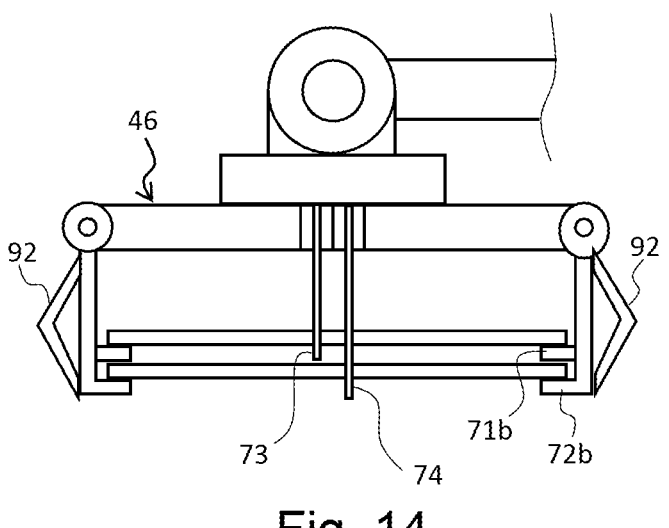
FIG. 14 shows a variation of the shields with respect to their shape.

FIG. 14 shows a variation of the side shields with respect to its shape. In the implementation shown in FIG. 14, each of the side shields 92 has a surface inclined so as to be laterally closer to the associated one of first claws 71b and the associated one of second claws 72b going from the center toward the ends. That is, each side shield 92 has a curved shape with a central portion protruding laterally outward, with the ends located laterally inward of the central portion. This allows air hitting the side shields to flow upward and downward away from the heated workpieces. FIG. 14 shows an arrangement with side shields that each have a surface inclined laterally inward from the center toward the ends as viewed from the side of the transportation apparatus. Alternatively, side shields may each have a surface inclined laterally inward from the center toward the ends when viewed from above the transportation apparatus.

In the implementation shown in FIG. 14, the side shields 92 cover the apparatus along the long length of the base frame 48. Thus, during transportation, the side shields 92 cover the first and second heated workpieces W1 and W2 along their long lengths. Thus, during transportation, the side shields prevent outside air from entering the space between the first and second heated workpieces W1 and W2 through the long-length sides. In the implementations of FIGS. 12 and 13, side shields are provided along both the long length and short length. Alternatively, side shields may be provided along either the long length or short length.

FIG. 15 illustrates other implementations, including an upper shield on the transportation apparatus 46. In each of the implementations shown in FIG. 15, an upper shield 95 is provided to cover the heated workpieces from above. The upper shield 95 is located to overlap both the first claws 71b and the second claws 72b when viewed from above. The upper shield 95 is supported by a plurality of support members 96 extending from the base frame 48 in the top-bottom direction. The upper shield 95 is located between the base frame 48 and the first claws 71b of the pair of first arms 71. Thus, the upper shield 95 is located close to the first heated workpiece W1 supported by the first claws 71b. Thus, air above the first heated workpiece W1 that has been warmed by heat radiation from the first heated workpiece W1 can easily stay between the first heated workpiece W1 and upper shield 95. Allowing warmed air to stay above the first heated workpiece W1 produces the temperature-retaining effect of the first heated workpiece W1. To further increase the temperature-retaining effect, the distance J1 between the first heated workpiece W1 and the upper shield 95 located above as measured in the direction normal to the sheet surfaces of the first heated workpiece W1 is preferably not larger than 200 mm, and more preferably not larger than 100 mm. For the same purposes, the distance J2 between the upper shield 95 and first claws 71b as measured in the top-bottom direction is preferably not larger than the maximum sheet thickness of the first heated workpiece W1 plus 200 mm. More preferably, the distance J2 is not larger than the maximum sheet thickness of the first heated workpiece W1 plus 100 mm. For example, if the sheet thickness of the first heated workpiece W1 varies by about 1 to 3 mm within the first heated workpiece W1, the maximum sheet thickness of the first heated workpiece W1 is 3 mm; thus, the distance J2 between the upper shield 95 and first claws 71b as measured in the top-bottom direction is preferably not larger than 203 mm, and more preferably not larger than 103 mm.

The left drawing in FIG. 15 shows an exemplary construction of the transportation apparatus 46 for transporting heated workpieces that are flat sheets. In such implementations, the upper shield 95 has the shape of a flat sheet. The right drawing in FIG. 15 shows an exemplary construction of the transportation apparatus 46 for transporting intermediate formed products that do not have the shape of a flat sheet. In such implementations, the upper shield 95 is shaped to conform to the intermediate formed products. Thus, the upper shield 95 is not limited to any particular shape. Further, the upper shield 95 may extend further outward from the first and second arms 71 and 72 when viewed from above. Furthermore, the transportation apparatus 46 may include both the side shields shown in FIG. 12, 13 or 14 (92, 94 or 91 and 93) and the upper shield 95 shown in FIG. 15. In such implementations, the upper shield 95 may be coupled to the side shields (92, 94 or 91 and 93), for example.

(Transportation of Differential-Thickness Sheet)

FIG. 16 shows an exemplary transportation apparatus 46 for transporting a differential-thickness sheet. In the implementation shown in FIG. 16, the first and second heated workpieces W1 and W2 are differential-thickness sheets each including a large-thickness portion and a small-thickness portion. During the transportation step, the workpieces are transported while the large-thickness portion of the first heated workpiece W1 supported by the first claws 71b of the pair of first arms 71 and the small-thickness portion of the second heated workpiece W2 supported by the second claws 72b of the pair of second arms 72 overlap each other in the direction normal to the sheet surface of the first heated workpiece W1. Thus, the workpieces are transported while a large-thickness portion, which has a relatively large heat capacity, faces a small-thickness portion, which has a small sheet thickness such that the temperature can easily decrease. This further reduces temperature drop in the small-thickness portion. This efficiently reduces temperature drop in the heated workpieces as a whole.

For example, the transportation apparatus 46 drives the first arms 71 to lift the first heated workpiece W1 and, then, rotates the base frame 48 about an axis in the top-bottom direction by 180 degrees. Thereafter, the apparatus drives the second arms 72 to lift the second heated workpiece W2. Thus, even if the first and second heated workpiece W1 and W2 on the transportation table 16 after heating are in the same orientation and their small-thickness portions are at the same location, the transportation apparatus 46 holds the second heated workpiece W2 as rotated by 180 degrees so as to hold the overlapping first and second heated workpieces W1 and W2 with their small-thickness portions reversed relative to each other.

The differential-thickness sheet may be, for example, a tailored blank produced by joining steel sheets with different sheet thicknesses with adjacent ends abutting each other. Alternatively, the differential-thickness sheet may be a patchwork-tailored blank produced by joining overlapping steel sheets with different sizes. Alternatively, the differential-thickness sheet may be a tailor-rolled blank made up of one steel sheet with some portions with sheet thicknesses changed by processing, such as rolling.

(Variations of Arms)

FIG. 17 shows a variation of the first and second arms 71 and 72. In the implementation shown in FIG. 17, the connecting portions of the first base 71a and first claw 71b of each first arm 71 are rotatable. That is, the first claw 71b is connected to the first base 71a so as to be rotatable about an axis in a lateral direction (y-direction). The first base 71a is fixed to the base frame 48. Similarly, for each second arm 72, the second claw 72b is connected to the second base 72a so as to be rotatable about an axis in a lateral direction (y-direction). With the claw of an arm being thus rotatable, controlling rotation of the claw controls the lateral location of the claw to implement the operations of lifting and lowering a heated workpiece.

In the implementation shown in FIG. 17, each first arm 71 further includes a claw 71c for supporting the upper surface of the first heated workpiece W1. Each second arm 72 further includes a claw 72c for supporting the upper surface of the second heated workpiece W2. Thus, a claw for supporting the upper surface of a heated workpiece may be provided on an arm. The claws 71b and 71c of the pair of first arms 71 and the claws 72b and 72c of the pair of second arms 72 may be used to sandwich the ends of the first and second heated workpieces W1 and W2 to hold the workpieces, thereby holding the workpieces in a stable manner even if the heated workpieces have small sheet thicknesses and low stiffnesses, and thus stably retaining the distance D between the first and second heated workpieces W1 and W2 in the direction normal to the sheet surface.

FIG. 18 shows another variation of the first and second arms 71 and 72. In the implementation shown in FIG. 18, a first arm 71 is mounted on the base frame 48 so as to be rotatable about an axis in the top-bottom direction (i.e., z-direction). A second arm 72 is mounted on the base frame 48 so as to be rotatable about an axis in the top-bottom direction (i.e., z-direction). Thus, the arms may be constructed to be rotatable about axes in the top-bottom direction to control the amount of laterally inward extension of the claws.

(Mechanism for Adjusting Location of Claw)

The distance between the pair of first claws 71b and the pair of second claws 72b as measured in the top-bottom direction may be adjustable. For example, at least one of the first base 71a of each first arm 71 and the second base 72a of each second arm 72 may be constructed to be extendable in the top-bottom direction. For example, at least one of the first and second bases 71a and 72a may be provided with an extension mechanism that can be extended in the top-bottom direction. This allows the locations of the claws to be adjusted to accommodate a heated workpiece being transported. It will be understood that the distance between the pair of third claws 73b and the pair of fourth claws 74b as measured in the top-bottom direction may similarly be adjustable.

(Variation of Support Structure for Heated Workpiece)

FIG. 19 shows a variation of the support structure of the transportation apparatus 46 for the first and second heated workpieces W1 and W2. FIG. 20 is a perspective view of the first and second heated workpieces W1 and W2 as supported by the transportation apparatus 46 shown in FIG. 19, showing the workpieces only. In the implementation shown in FIGS. 19 and 20, the first and second heated workpieces W1 and W2 are supported by the transportation apparatus 46 while the workpieces overlap in the top-bottom direction (i.e., direction normal to the first heated workpiece W1) and are in contact with each other. Specifically, the lower surface of the first heated workpiece W1 supported by the pair of first claws 71b of the first arms 71 is in contact with the upper surface of the second heated workpiece W2 supported by the pair of second claws 72b of the second arms 72. In this implementation, the entire upper surface of the second heated workpiece W2, i.e., the lower workpiece, is in contact with part of the lower surface of the first heated workpiece W1, i.e., the upper workpiece. In this implementation, the distance D between the first and second heated workpieces W1 and W2 is 0 mm. The width B1 of the sheet surfaces of the first heated workpiece W1, i.e., the upper workpiece, is larger than the width B2 of the second heated workpiece W2, i.e., the lower workpiece. Further, the distance between the second claws 72b supporting the second heated workpiece W2 is smaller than the distance between the first claws 71b supporting the first heated workpiece W1. That is, the second claws 72b protrude further inward than the first claws 71b do. The distance H between the pair of first claws 71b and the pair of second claws 72b as measured in the top-bottom direction is generally equal to the sheet thickness of the second heated workpiece W2.

FIG. 21 shows another variation of the support structure of the transportation apparatus 46 for the first and second heated workpieces W1 and W2. FIG. 22 is a perspective view of the first and second heated workpieces W1 and W2 as supported by the transportation apparatus 46 shown in FIG. 21, showing the workpieces only. In the implementation shown in FIGS. 21 and 22, the first and second heated workpieces W1 and W2 are supported by the transportation apparatus 46 while the workpieces overlap in the top-bottom direction (i.e., direction normal to the first heated workpiece W1) and are in contact with each other. Specifically, the lower surface of the first heated workpiece W1 supported by the pair of first claws 71b of the first arms 71 and the upper surface of the second heated workpiece W2 supported by the pair of second claws 72b of the second arms 72 are separated from each other along two end portions as determined along the width direction, and are in contact with each other in the portions between these two end portions. In this implementation, as measured in the portions between the end portions, the distance D between the first and second heated workpieces W1 and W2 is 0 mm. The first heated workpiece W1, i.e., the upper one, and the second heated workpiece W2, i.e., the lower one, have the same shape when viewed from above. The first claws 71b are inserted into the spaces defined by the separated end portions of the first and second heated workpieces W1 and W2. The distance D between the separated end portions is larger than the thickness of the first claws 71b (i.e., size in the top-bottom direction). In the implementation shown in FIGS. 21 and 22, the end portions of the first heated workpiece W1, i.e., the upper workpiece, is curved so as to be located higher than the portions between the end portions. The end portions of the second heated workpiece W2, i.e., the lower workpiece, are curved so as to be located lower than the portions between the end portions. The separating of end portions is not limited to this manner. For example, as shown in FIG. 23, the first and second heated workpieces W1 and W2 may be shaped such that the end portions of one workpiece are curved and the end portions of the other are not. Similar to the implementation of FIG. 2A, the distance H between the pair of first claws 71b and the pair of second claws 72b as measured in the top-bottom direction is preferably 0 to 50 mm plus the sheet thickness of the second heated workpiece W2. Since the first claws 71b are inserted into the spaces defined by the separated end portions of the first and second heated workpieces W1 and W2, a lower limit for the distance H may be the sheet thickness of the second heated workpiece W2 plus the lower limit for the thickness of the first claws 71b. For example, a lower limit for the distance H is preferably the sheet thickness of the second heated workpiece W2 plus 3 mm, and more preferably the sheet thickness of the second heated workpiece W2 plus 5 mm. In the implementation shown in FIGS. 21 and 22, the separated end portions of the first and second heated workpieces W1 and W2 are located along the pair of long-length sides; however, separating of end portions is not limited to this manner. For example, separated end portions of the first and second heated workpieces W1 and W2 may be located along the pair of short-length sides. Further, separated end portions may be provided along both the pair of long-length sides and the pair of short-length sides.

In the implementation shown in FIGS. 21 to 23, the two end portions, as determined along the width direction, one of the first and second heated workpieces W1 and W2 are separated from the respective end portions of the other workpiece along the entire length perpendicular to the width direction. Alternatively, just some portions of the two end portions, as determined along the width direction, of each workpiece may be separated. FIG. 24 shows an exemplary support structure of the transportation apparatus 46 for the first and second heated workpiece W1 and W2 in such an implementation. FIG. 25 is a perspective view of the first and second heated workpieces W1 and W2 as supported by the transportation apparatus 46 shown in FIG. 24, showing only the workpieces. In the implementation shown in FIGS. 24 and 25, portions of the two end portions, along the width direction, of each of the first and second workpieces W1 and W2 that correspond to the pair of first claws 71b of the first arms 71 are separated, while the other portions of the same end portions are in contact. Further, portions of the two end portions, along the length direction, of each of the first and second heated workpieces W1 and W2 that correspond to the pair of third claws 73b of the third arms 73 are separated, while the other portions of the same end portions are in contact. This reduces the separated portions of the end portions of the first and second heated workpieces W1 and W2. In the implementation shown in FIGS. 24 and 25, the end portions of both the first and second heated workpieces W1 and W2 have curves. Alternatively, for example, as shown in FIG. 26, the first and second heated workpieces W1 and W2 may be shaped such that the end portions of one workpiece have curves and the end portions of the other do not.

Embodiment 2

(Exemplary Transportation Using Tray and Heat Storage Member)

FIG. 27 shows an exemplary construction of the hot-press manufacturing line 10 in an implementation where a tray and a heat storage member are used in transporting the first and second heated workpieces W1 and W2. The hot-press manufacturing line 10 shown in FIG. 27 further includes a tray 1. The tray 1 is a tray on which the first and second heated workpieces W1 and W2 are placed while being in the heating device 14 and on the transportation table 16. The tray 1 includes a tray body 2, a heat storage member 5 placed on the tray body 2, and a first group of struts 3. The first group of struts 3 include at least three struts extending upward from the tray body 2 or heat storage member 5 to locations higher than the upper surface of the heat storage member 5. The first group of struts 3 are disposed such that the imaginary straight lines connecting the struts form at least one triangle when viewed from above. FIG. 27 shows an implementation where the first and second heated workpieces W1 and W2 are heated by the heating device 14 and transported by the transportation table 16 while being on one tray. In one variation, the first and second heated workpieces W1 and W2 may be heated and transported while being on separate trays, one tray for one workpiece. Further, three or more heated workpieces may be placed on a single tray during heating and transportation.

In the heating device 14, the first and second heated workpieces W1 and W2 are heated while being supported by the first group of struts 3 but located separately. Thus, the first heated workpiece W1 and the second heated workpiece W2 are at different locations when viewed from above, supported at locations above the heat storage member 5 and overlapping the heat storage member 5. The first and second heated workpieces W1 and W2 are transported from the heating device 14 to the lifting location for the transportation apparatus 46 on the transportation table 16 while being on the tray 1. Thus, the first and second heated workpieces W1 and W2 are overlapping the heat storage member 5 during the time after heating until lifting by the transportation apparatus 46. This reduces temperature drop. Further, the first group of struts 3 do not represent an obstacle when the transportation apparatus 46 is lifting upward the first and second heated workpieces W1 and W2 placed on the first group of struts 3.

In the implementation shown in FIG. 27, the heat storage member 5 is in contact with the tray body 2. Positioning of the heat storage member 5 is not limited to this manner. For example, although not shown, the heat storage member 5 may be placed on a second group of struts provided separately from the first group of struts 3, and positioned to overlap the tray body 2 in the top-bottom direction, with a distance from the tray body. The second group of struts include at least three struts extending upward from the tray body 2 and positioned at locations different from those of the struts of the first group 3 when viewed from above. This prevents deformation caused by heat of the tray body 2.

The tray body 2 may include empty spaces shaped to expand perpendicularly to the top-bottom direction and extending through the tray body in the top-bottom direction. This facilitates transfer of heat from below the tray body 2 to the heat storage member 5 and to the first and second heated workpieces W1 and W2 during the heating step.

The area of the upper surface of the heat storage member 5 may be larger than the area of the upper surfaces of the first and second heated workpieces W1 and W2. In such implementations, during the heating step and during transportation, i.e., when the first and second heated workpieces W1 and W2 are being transported to the lifting location for the transportation apparatus 46 while on the tray 1, it is preferable that the edges of the heat storage member 5 on the tray body 2 are located outward of the edges of the first and second heated workpieces W1 and W2 placed on the first group of struts 3 when viewed from above. This allows the entire first and second heated workpieces W1 and W2 to receive radiant heat from the heat storage member 5. This makes it easier to maintain the temperature of the entire heated workpieces at a uniform level.

For example, the sheet thickness of the heat storage member 5 may be larger than the maximum sheet thickness of the first and second heated workpieces W1 and W2. In such implementations, temperature drop in the first and second heated workpieces W1 and W2 is reduced by radiant heat from the heat storage member 5, which has a relatively large heat capacity. This effectively reduces temperature drop in the heated workpieces.

(Tray)

FIG. 28 is a top view of the tray 1. FIG. 29 is a side view of the tray 1 shown in FIG. 28 as viewed in the direction of arrow F. In the implementation shown in FIG. 28, the tray body 2 includes empty spaces 2G shaped to expand in a plane perpendicular to the top-bottom direction and extending in the top-bottom direction through the tray body. When viewed from above, the total area of the empty spaces 2G is larger than the total area occupied by the constituent members of the tray body 2. The tray 1 includes a heat storage member 5 placed on the tray body 2. The tray 1 includes a plurality of struts 3 extending to locations higher than the heat storage member 5.

(Tray Body)

In the implementation shown in FIG. 28, the tray body 2 includes a frame 2c and rod members 2f located inside the frame 2c and bridging the frame. The frame 2c includes a pair of vertical frame members 2b and a pair of horizontal frame members 2a. The pair of vertical frame members 2b are located parallel to each other, and laterally separated. The pair of horizontal frame members 2a are located between the vertical frame members 2b and parallel to each other, and vertically separated. The pair of vertical frame members 2b and the pair of horizontal frame members 2a form a rectangular frame 2c when viewed from above. The rod members 2f include vertical rod members 2d and horizontal rod members 2e. The vertical rod members 2d bridge the pair of horizontal frame members 2a. The horizontal rod members 2e bridge the pair of vertical frame members 2b. The rod members 2f are disposed grid-wise inside the frame 2c.

The rod members 2f (i.e., at least one of the set of vertical rod members 2d and the set of horizontal rod members 2e) may be constructed to be adjustable in position relative to the frame 2c. For example, the frame 2c may be provided with a plurality of positioning holes or engagement lugs. In such implementations, the rod members 2f are fixed to the holes or engagement lugs on the frame 2c using fastening members, for example, as necessary. The locations of the rod members 2f relative to the frame 2c can be adjusted by changing the holes or engagement lugs, i.e. locations, to which the rod members 2f are fixed.

The construction of the tray body 2 is not limited to the implementation shown in FIG. 28. For example, the tray body may have the shape of a ladder including a pair of vertical rod members disposed generally parallel and separated from each other, and a plurality of horizontal rod members located between the vertical rod members and bridging the pair of vertical rod members in the direction perpendicular thereto. Alternatively, the tray body may be constituted by a sheet-shaped member including a plurality of holes extending through the tray body in the top-bottom direction, which serve as empty spaces.

The constituent members of the tray body 2 (in the implementation of FIG. 28, frame 2c and rod members 20 may be pipes or solid members. Alternatively, the constituent members of the tray body 2 may be angle members with an L-shaped cross section, or channel members with a U-shaped cross section. The constituent members of the tray body 2 are not limited to any particular material, and may be formed from a heat-resistant material, such as heat-resistant steel or ceramics, for example. It is desirable that the maximum use temperature of the constituent members be, for example, not lower than 900° C., a temperature range commonly found in heating devices, and not higher than 1050° C., which is an upper-limit setting temperature for heating devices. Examples of heat-resistant steels (heat-resistant alloy steels) that can be used for the constituent members include SCH22 (0.4C-25Cr-20Ni) and SCH24 (0.4C-25Cr-35Ni—Mo, Si). Constituent members of the tray body 2 formed from a heat-resistant alloy steel can be easily processed and produced. It will be understood that the above-listed materials that can be used for the constituent members of the tray body 2 may also be used as the material of the struts 3.

(Heat Storage Member)

The heat storage member 5 is placed on the tray body 2. The heat storage member 5 is a sheet-shaped member. The heat storage member 5 is rectangular in shape when viewed from above. The heat storage member 5 includes through-holes that allow the struts 3 to extend therethrough. The struts 3 extend upward through the through-holes in the heat storage member 5 placed on the tray body 2.

The heat storage member 5 is not limited to any particular material, and is formed from a heat-resistant material, such as heat-resistant metal or ceramics, for example. Examples of heat resistant metals that can be used as the material of the heat storage member 5 include heat-resistant steels, stainless steels, Ni-based alloys, and other alloys. The lower the thermal conductivity of the heat storage member 5, the better. If the thermal conductivity is low, temperature does not easily decrease, which prolongs the effect of providing supplemental amounts of heat by radiant heat on the first and second heated workpieces W1 and W2. For example, the heat storage member 5 may be formed from a material with a thermal conductivity that is substantially equal to, or lower than, that of the workpieces being heated. For example, although not limiting, the thermal conductivity of the heat storage member 5 is preferably not higher than 200 W/mK, more preferably not higher than 100 W/mK, and yet more preferably not higher than 70 W/mK. After the first and second heated workpieces W1 and W2 have been lifted by the transportation apparatus 46 and transported to the pressing locations, the heat storage member 5 and tray 1 may be used for the heating and transportation steps for other workpieces.

(Struts)

The struts 3 are shaped to extend upward from the tray body 2 to locations higher than the upper surface of the heat storage member 5. A plurality of struts 3 are disposed such that the imaginary straight lines connecting the struts 3 form at least one triangle when viewed from above. The plurality of struts 3 are constructed in such a manner that the first heated workpiece W1 or second heated workpiece W2 can be placed thereon while the workpiece overlaps the heat storage member 5 in the top-bottom direction but is separated from the member with a distance. In the implementation shown in FIG. 28, every one of the struts 3 is located between adjacent empty spaces 2G of the tray body 2 when viewed from above. That is, a strut 3 is located on a constituent member of the tray body 2 sandwiched by empty spaces 2G.

In the implementation shown in FIG. 29, the plurality of struts 3 extend through the heat storage member 5. The heat storage member 5 includes through-holes that allow the plurality of struts 3 to extend therethrough. Thus, as shown in FIG. 28, a plurality of struts 3 can be disposed inside the edges of the heat storage member 5 when viewed from above. In such implementations, the first heated workpiece W1 can be positioned on the plurality of struts 3 such that the entire first heated workpiece W1, which has a smaller area than the heat storage member 5, overlaps the heat storage member 5 when viewed from above. In the implementation shown in FIG. 29, the heat storage member 5 is a flat sheet; alternatively, the shape of the heat storage member 5 may conform to the first heated workpiece W1, for example. In such implementations, the distance between the first heated workpiece W1 and heat storage member 5 can be approximately uniform across the entire area. It will be understood that, while FIG. 29 illustrates the positioning of the first heated workpiece W1, the second heated workpiece W2 can be positioned in a manner similar to that for the first heated workpiece W1.

The maximum distance Dc (mm) between the heat storage member 5 placed on the tray body 2 and the first and second heated workpieces W1 and W2 placed on the struts 3 as measured in the top-bottom direction, on the one hand, and the minimum sheet thickness t1 (mm) of the thinnest portion of the first and second heated workpieces W1 and W2, on the other, are preferably in the relationship represented by the expression indicated below. This effectively reduces temperature drop in the first heated workpiece W1 on the tray 1 during transportation.

$$Dc \leq 120t1$$

Further, the above-mentioned minimum sheet thickness t1 (mm) and the minimum sheet thickness t2 (mm) of the thinnest portion of the heat storage member 5 may be in the relationship represented by the expression indicated below. This effectively reduces temperature drop in the workpieces.

$$0.8 \leq t2/t1 \leq 20$$

The placing of the first and second heated workpieces W1 and W2 above the heat storage member 5 is not limited to the above arrangement. For example, the struts 3 that allow the first and second heated workpieces W1 and W2 to be placed thereon may be provided on the heat storage member 5. In such implementations, the struts 3 may be part of the heat storage member 5. Alternatively, at least portions of the first and second heated workpieces W1 and W2 may be in contact with the heat storage member 5. For example, the heat storage member 5 may include a projection protruding upward. The projection may be shaped so as to be able to support the first and second heated workpieces W1 and W2. For example, the top surface of the projection may be a flat surface. In such implementations, the top surface provides the surface on which the first and second workpieces W1 and W2 are placed. In other implementations, the projection may be at least one ridge. In other implementations, the heat storage member 5 may be curved in shape in the top-bottom direction.

In another variation of the heat storage member 5, portions of the heat storage member 5 that are located outward of the edges of the first and second heated workpieces W1 and W2 when viewed from above may extend upward. This allows radiant heat from the side edges of the first and second heated workpieces W1 and W2 and from the portions of the heat storage member 5 that extend upward to provide supplemental amounts of heat for one another. By way of example, portions of the heat storage member 5 located outward of the edges of the first and second heated workpieces W1 and W2 when viewed from above may extend upward to heights that are at least equal to those of the first and second heated workpieces W1 and W2. Thus, the sides of the workpieces are covered with the heat storage member 5. This retains the temperature-retaining effect as is the case with implementations with side shields.

Embodiment 3

(Exemplary Transportation Using Tray)

FIG. 30 is an exemplary construction of the hot-press manufacturing line 10 in an implementation where a tray is used in heating and transporting the first and second heated workpieces W1 and W2 as overlapping each other. The hot-press manufacturing line 10 shown in FIG. 30 further includes a tray 1. The tray 1 is a tray on which the first and second heated workpieces W1 and W2 are placed while being in the heating device 14 and on the transportation table 16. The tray 1 includes a tray body 2 and a group of struts 3 extending upward from the tray body 2. The group of struts 3 include a first sub-group of struts that allow the first heated workpiece W1 to be placed thereon, and a second sub-group of struts that allow the second heated workpiece W2 to be placed thereon. The first sub-group of struts include at least three struts constructed to be able to support the lower surface of the first heated workpiece W1. The second sub-group of struts includes at least three struts constructed to be able to support the second heated workpiece W2 such that the second heated workpiece W2 is positioned above the first heated workpiece W2 supported by the first sub-group of struts. The first sub-group of struts are disposed such that the imaginary straight lines connecting the struts form at least one triangle when viewed from above. The second sub-group of struts are positioned at locations different from those of the first sub-group of struts when viewed from above and disposed such that the imaginary straight lines connecting the struts form at least one triangle when viewed from above. Every strut of the second sub-group is higher than that one of the struts of the first sub-group whose top is located lowest.

In the heating device 14, the workpieces are heated while the first heated workpiece W1 is placed on the first sub-group of struts and the second heated workpiece W2 is placed on the second sub-group of struts and positioned above the first heated workpiece W1 so as to overlap it. The first and second heated workpieces W1 and W2, while being placed on the tray 1, are transported from the heating device 14 to the lifting location for the transportation apparatus 46 on the transportation table 16. Thus, the first and second heated workpieces W1 and W2 are overlapping each other during the time after heating until lifting by the transportation apparatus 46. This reduces temperature drop.

At the lifting location on the transportation table 16, the workpieces may be lifted upward simultaneously by the transportation apparatus 46, where the first heated workpiece W1 on the first sub-group of struts and the second heated workpiece W2 on the second sub-group of struts are supported by the second claws 72*b* of the second arms 72 and the first claws 71*b* of the first arms 71, respectively, and transported by the transportation apparatus 46 to the respective pressing locations in the press machine 20. During this, the operation of driving the first arms 71 to position the pair of first claw 71*b* on the lower surface of the second heated workpiece W2 and the operation of driving the second arms 72 to position the pair of second claws 72*b* on the lower surface of the first heated workpiece W1 may occur simultaneously, or may occur successively. As the first and second heated workpieces W1 and W2 placed on the tray 1 are simultaneously lifted by the transportation apparatus 46, the transportation time can be reduced, thereby further reducing temperature drop. Alternatively, the second heated workpiece W2 on the second sub-group of struts may be lifted up by the first claws 71*b* of the first arms 71 of the transportation apparatus 46 and then the first heated workpiece W1 on the first sub-group of struts may be lifted by the second arms 72 of the transportation apparatus 46 before these workpieces are transported by the transportation apparatus 46 to the respective pressing locations in the press machine 20. The group of struts 3 present no obstacle when the transportation apparatus 46 is simultaneously or successively lifting upward the first heated workpiece W1 on the first sub-group of the group of struts 3 and the second heated workpiece W2 on the second sub-group of struts.

The tray body 2 may include empty spaces shaped to expand perpendicularly to the top-bottom direction and extending through the tray body in the top-bottom direction. This facilitates transfer of heat from below the tray body 2 to the first and second heated workpieces W1 and W2 during the heating step. Each of the struts of the first and second sub-groups may be located between adjacent empty spaces of the tray body 2 when viewed from above. This further facilitates transfer of heat from below the tray body 2 to the first heated workpiece W1 on the first sub-group of struts and the second heated workpiece W2 on the second sub-group of struts through the empty spaces surrounding the first and second sub-groups of struts.

The second sub-group of struts may include at least three struts that are higher than at least three respective struts of the first sub-group by a predetermined height ΔH. In such implementations, the second heated workpiece supported by the second sub-group of struts may be positioned at locations that are higher than the first heated workpiece supported by first sub-group of struts by the predetermined height ΔH.

(Tray)

FIG. 31 is a top view of the tray 1. FIG. 32 is a side view of the tray 1 shown in FIG. 31 as viewed in the direction of arrow F. In the implementation shown in FIG. 31, the tray body 2 includes empty spaces 2G shaped to expand in a plane perpendicular to the top-bottom direction and extending through the tray body in the top-bottom direction. When viewed from above, the total area of the empty spaces 2G is larger than the total area occupied by the constituent members of the tray body 2. The tray 1 includes a plurality of struts 3 (3a and 3b) extending upward from the tray body 2. The plurality of struts 3 include a first sub-group of struts 3a that allow the first heated workpiece W1 to be placed thereon and a second sub-group of struts 3b that allow the second heated workpiece W2 to be placed thereon above the first heated workpiece W1. Every one of the struts of the first and second sub-groups 3a and 3b is located between adjacent empty spaces 2G of the tray body 2 when viewed from above.

(Tray Body)

In the implementation shown in FIG. 31, the tray body 2 includes a frame 2c and rod members 2f located inside the frame 2c and bridging the frame. The frame 2c includes a pair of vertical frame members 2b and a pair of horizontal frame members 2a. The pair of vertical frame members 2b are located parallel to each other, and laterally separated. The pair of horizontal frame members 2a are located between the vertical frame members 2b and parallel to each other, and vertically separated. The pair of vertical frame members 2b and the pair of horizontal frame members 2a form a rectangular frame 2c when viewed from above. The rod members 2f include vertical rod members 2d and horizontal rod members 2e. The vertical rod members 2d bridge the pair of horizontal frame members 2a. The horizontal rod members 2e bridge the pair of vertical frame members 2b. The rod members 2f are disposed grid-wise inside the frame 2c.

The rod members 2f (i.e., at least one of the set of vertical rod members 2d and the set of horizontal rod members 2e) may be constructed to be adjustable in position relative to the frame 2c. For example, the frame 2c may be provided with a plurality of positioning holes or engagement lugs. In such implementations, the rod members 2f are fixed to the holes or engagement lugs on the frame 2c using fastening members, for example, as necessary. The locations of the rod members 2f relative to the frame 2c can be adjusted by changing the holes or engagement lugs, i.e. locations, to which the rod members 2f are fixed.

The constituent members of the tray body 2 (in the implementation of FIG. 31, frame 2c and rod members 20 may be pipes or solid members. Alternatively, the constituent members of the tray body 2 may be angle members with an L-shaped cross section, or channel members with a U-shaped cross section. The constituent members of the tray body 2 are not limited to any particular material, and may be formed from a heat-resistant material, such as heat-resistant steel or ceramics, for example. It is desirable that the maximum use temperature of the constituent members be, for example, not lower than 900° C., a temperature range commonly found in heating devices, and not higher than 1050° C., which is an upper-limit setting temperature for heating devices. Examples of heat-resistant steels (heat-resistant alloy steels) that can be used for the constituent members include SCH22 (0.4C-25Cr-20Ni), SCH24 (0.4C-25Cr-35Ni—Mo, Si). Constituent members of the tray body 2 formed from a heat-resistant alloy steel can be easily processed and produced. It will be understood that the above-listed materials that can be used for the constituent members of the tray body 2 may also be used as the material of the struts 3.

(Struts)

The first sub-group of struts 3a include at least three struts, where the imaginary straight lines connecting the struts form a triangle when viewed from above. The second sub-group of struts 3b include at least three struts, where imaginary straight lines connecting the struts form a triangle when viewed from above. Every one of the struts of the second sub-group 3b is at a location different from that of any one of the struts of the first sub-group 3a when viewed from above. The top of every one of the struts of the second sub-group 3b is located higher than the top of that strut of the first sub-group 3a whose top is located lowest. Thus, the first sub-group of struts 3a are capable of supporting the first heated workpiece W1. The second group of struts 3b are capable of supporting the second heated workpiece W2 such that this workpiece is located above the first heated workpiece W1 supported by the first sub-group of struts 3a.

The second sub-group of struts 3b are positioned in the sub-regions occupied by the second heated workpiece W2 when viewed from above but that do not overlap the region occupied by the first heated workpiece W1. Further, the second sub-group of struts 3b are constructed not to overlap the region occupied by the first heated workpiece W1 when viewed from above. That is, the second sub-group of struts 3b are constructed such that the first heated workpiece W1, when lifted up by the transportation apparatus 46, does not get snagged on the second sub-group of struts 3b.

The struts of the first sub-group 3a and those of the second sub-group 3b are not limited to any particular numbers. The number of the struts of the first sub-group 3a and the number of the struts of the second sub-group 3b may be the same or different. For example, the number of the struts of the second sub-group 3b may be larger than the number of the struts of the first sub-group 3a if the support for the second heated workpiece W2 is to be stronger than that for the first heated workpiece W1 to take account of the characteristics and/or support locations of the first and second heated workpieces W1 and W2, for example.

In the implementation shown in FIG. 31, the first heated workpiece W1 includes notches on its edges (i.e., ends) when viewed from above. The struts of the second sub-group 3b are located in regions corresponding to the notches of the first heated workpiece W1. As the struts of the second sub-group 3b are located in the regions corresponding to the notches or holes of the first heated workpiece W1, the struts of the second sub-group 3b can be positioned in regions that do not overlap the first heated workpiece W1 when viewed from above. The first sub-group of struts, second sub-group of struts and heated workpieces are not limited to the constructions shown in FIG. 31. For example, the first and second heated workpieces W1 and W2 with the same shape may be positioned to be displaced when viewed from above. In such implementations, when viewed from above, the first and second heated workpieces W1 and W2 are positioned such that no portions of the second heated workpiece W2 overlap the first heated workpiece W1. The struts of the second sub-group 3b are positioned in a region where the second heated workpiece W2 is present and that does not overlap the region where the first heated workpiece W1 is present. Such implementations require no notches, holes or the like in the first heated workpiece W1.

Referring to FIG. 32, the maximum distance Dt (mm) between the first heated workpiece W1 placed on the first sub-group of struts 3*a* and the second heated workpiece W2 placed on the second sub-group of struts 3*b* as measured in the top-bottom direction, on the one hand, and the minimum sheet thickness t (mm) of the thinnest portion of the first and second heated workpieces W1 and W2, on the other, are preferably in the relationship represented by the expression below. This effectively reduces temperature drop in the first and second heated workpieces W1 and W2 during transportation.

$$Dt \leq 120t$$

For the same reasons, $Dt \leq 100t$ is more preferable, and $Dt \leq 60t$ is yet more preferable. Further, the distance Dt (mm) is preferably not larger than 100 mm, and more preferably not larger than 50 mm, for example.

In the implementation shown in FIG. 32, ΔH is the difference in height between the first and second sub-groups of struts 3*a* and 3*b*. The range of ΔH (mm) may be the above-mentioned distance Dt (mm) plus the maximum sheet thickness of the first heated workpiece W1, for example. By way of example, if the sheet thickness of the first heated workpiece W1 varies by about 1 to 3 mm within the first heated workpiece W1, ΔH is preferably 3 to 103 mm, and more preferably 3 to 53 mm.

(Other Variations)

The present invention is not limited to the above-described embodiments. For example, the third and fourth arms 73 and 74 may be omitted. Further, in the above-discussed implementations, the lateral direction in which the pair of first arms 71 are arranged and the lateral direction in which the pair of second arms 72 are arranged are the same, i.e., x-direction. In some variations, for example, the pair of first arms 71 may be arranged in the x-direction while the pair of second arms 72 may be arranged in the y-direction perpendicular to the x-direction. In the above-described implementations, the second arms 72 are longer than the first arms 71; alternatively, the first arms 71 may be longer than the second arms 72. Similarly, the third arms 72 may be longer than the fourth arms 74.

In the above-described embodiments, a plurality of pairs of first arms 71 and a plurality of pairs of second arms 72 are provided. Alternatively, one pair of first arms 71 and one pair of second arms 72 may be provided.

The base frame 48 may be extendable in a lateral direction (at least one of the x- and y-directions).

[Experiment 1]

A steel sheet was heated and temperature changes after completion of heating were measured under various conditions. Specifically, the experiment was conducted as follows: The samples used were steel sheets for hot pressing of the order of 1.5 GPa having a sheet thickness of 0.8 mm or 1.6 mm, and temperature was measured by thermocouples attached to a surface of the steel sheet. The steel sheet was heated in a heating furnace to 950° C., and temperature drop after removal from the heating furnace and during air cooing was measured. For Comparative Example 1, temperature was measured where a single steel sheet with a sheet thickness of 1.6 mm was heated alone and left to cool; for Comparative Example 2, a single steel sheet with a sheet thickness of 0.8 mm was heated alone and left to cool; for the inventive examples, two steel sheets with a sheet thickness of 0.8 mm were positioned to overlap each other in the direction normal to the sheet surfaces and fixedly arranged with a predetermined distance D. Three values of the distance D between the two overlapping steel sheets were used: 10 mm, 30 mm, and 50 mm, which provided Inventive Example 1, Inventive Example 2, and Inventive Example 3, respectively. FIG. 33 indicates locations at which temperature was measured. The temperature of each of the upper and lower steel sheets was measured at locations of 5 mm, 20 mm, 30 mm, and 50 mm away from an edge of the steel sheet, and at the center of the steel sheet.

FIG. 34 is a graph of measurements of average temperature drop rate. The average temperature drop rate was derived across the section for 800° C. to 750° C. along the temperature drop curve from measurements. FIG. 35 is a graph indicating the range from which the average temperature drop rates were derived. The results shown in FIG. 34 demonstrate that, for all the measurement locations, the average temperature drop rates for Inventive Examples 1 to 3, which had two steel sheets overlapping in the top-bottom direction with a sheet thickness of 0.8 mm, were lower than that for Comparative Example 1, which had a single steel sheet with a sheet thickness of 0.8 mm. The results also demonstrate that, with two overlapping steel sheets, examples with lower values of the distance D between the two steel sheets achieved lower average temperature drop rates near the edges of the steel sheets and achieved greater improvements in average temperature drop rate for all the measurement locations. Experiment 3, which had a distance D of 50 mm, improved the temperature drop rate to an extent approximately in the middle between that for Comparative Example 1, which had a single steel sheet with a sheet thickness of 0.8 mm, and that for Comparative Example 2, which had a single steel sheet with a sheet thickness of 1.6 mm. Inventive Example 1, which had a distance D of 10 mm, improved the temperature drop rate to an extent substantially equal to that of Comparative Example 2, which had a single steel sheet with a sheet thickness of 1.6 mm. Setting an appropriate distance D between the two overlapping steel sheets achieved temperature-drop characteristics substantially equal to those of a steel sheet with a sheet thickness that was twice as large, i.e., with a heat capacity that was twice as high.

(Experiment 2)

Next, two steel sheets overlapping in the top-bottom direction with a sheet thickness of 0.8 mm were heated by a heater to 950° C. and, after completion of heating, temperature drop was measured during transportation by the transportation apparatus. The transportation speed of the transportation apparatus was 1.6 m/s at maximum, and the distance of movement was about 3.2 m. Further, temperature drop was measured where, in some examples, a shield was mounted on the transportation apparatus, located forward and upward as determined along the direction of transportation. FIG. 36 shows the construction of the shield, 97, used in Experiment 2. The shield 97 was installed so as to completely cover the entirety of the two steel sheets M1 and M2 during transportation when viewed from the front and to cover the entirety of the steel sheets M1 and M2 when viewed from above. The distance D between the two steel sheets M1 and M2 was 30 mm. To exactly fix the distance D during the experiment, the upper and lower steel sheets M1 and M2 were fixed by coupling members 31 during heating and transportation. No shield was provided for Inventive Example 4, and the shield was provided for Inventive Example 5. Temperature was measured at locations of 5 mm, 30 mm, and 50 mm away from an edge of each of the steel sheets M1 and M2. The temperature of each of the upper and lower steel sheets M1 and M2 was measured by thermocouples NT.

FIG. 37 is a graph of measurements of average temperature drop rate. The period of time of movement of the steel sheets by the transportation apparatus, measured after exit from the heating furnace, was in the range from about 5 seconds to 8 seconds; in view of this, the average temperature drop rate was derived across the section for 5 seconds to 8 seconds after exit from the heating furnace along the temperature drop curve from measurements. FIG. 38 is a graph indicating the range from which the average temperature drop rates were derived. The results shown in FIG. 37 show that Inventive Example 4, which had no shield, had a relatively high temperature drop rate at the edge of each of the steel sheets. The results also show that the upper steel sheet had a higher temperature drop rate than the lower steel sheet. This tendency is similar to that for the results of Inventive Example 2 in FIG. 34, for which the distance D was 30 mm and temperature was measured in a stationary state, but with larger absolute values of temperature drop rate due to transportation. On the other hand, Inventive Example 5, for which a shield was mounted on the transportation apparatus located forward and upward as determined along the direction of transportation, achieved a significantly improved temperature drop rate at the edge of each of the steel sheets, and achieved significant improvements in the upper steel sheet. Further, the differences in temperature drop rate among the various locations in the sheet-width direction and between the upper and lower steel sheets were significantly reduced.

The above results show the importance of retaining an appropriate distance between a plurality of heated workpieces during transportation of the heated workpieces overlapping in the direction normal of the sheet surfaces in order to reduce temperature drop rate. According to the above-described embodiments, both ends of the first and second heated workpieces are supported by the first and second claws, respectively, thereby retaining the distance between the two workpieces in a stable manner. This will make it possible to transport the first and second heated workpieces in a simple and efficient manner while reducing temperature drop.

REFERENCE SIGNS LIST

46: transport apparatus
48: base frame
71: first arms
71b: first claws
72: second arms
72b: second claws
W1: first workpiece (being) heated
W2: second workpiece (being) heated
The invention claimed is:

1. A method of manufacturing a press-formed product comprising:

a heating step in which at least two sheet-shaped workpieces are simultaneously heated by a heating device;

a transportation step in which the at least two heated workpieces heated at the heating step are transported by a transportation apparatus to a press machine; and a pressing step in which the at least two heated workpieces transported to the press machine at the transportation step are processed by the press machine, the transportation step including:

driving a pair of first arms rotatably mounted on a base frame included in the transportation apparatus to cause claws of the pair of first arms to support a lower surface, at both ends, of a first heated workpiece of the at least two heated workpieces and lift the first heated workpiece;

driving, using a system separate from that for the pair of first arms, a pair of second arms rotatably mounted on the base frame included in the transportation apparatus to cause claws of the pair of second arms to support a lower surface, at both ends, of a second heated workpiece of the at least two heated workpieces and lift the second heated workpiece;

transporting the first heated workpiece with the lower surface supported, at both ends, by the claws of the pair of first arms of the transportation apparatus and the second heated workpiece with the lower surface supported, at both ends, by the claws of the pair of second arms, where the first and second heated workpieces overlap each other in a direction normal to a sheet surface of the first heated workpiece;

driving the pair of first arms to lower the first heated workpiece supported by the pair of first arms to a pressing location on the press machine; and driving the pair of second arms using the system separate from that for the pair of first arms to lower the second heated workpiece supported by the pair of second arms to a pressing location on the press machine.

2. The method of manufacturing a press-formed product according to claim 1, wherein, during the transportation step, the first heated workpiece with the lower surface supported, at both ends, by the claws of the pair of first arms, and the second heated workpiece with the lower surface supported, at both ends, by the claws of the pair of second arms, are transported while overlapping with a distance not larger than 50 mm in the direction normal to the sheet surface of the first heated workpiece.

3. The method of manufacturing a press-formed product according to claim 1, wherein, during the transportation step, a maximum distance D (mm) between the first heated workpiece with the lower surface supported, at both ends, by the claws of the pair of first arms and the second heated workpiece with the lower surface supported, at both ends, by the claws of the pair of second arms, as measured in the direction normal to the sheet surface and a minimum sheet thickness t (mm) of a thinnest portion of the first and second workpieces are in the relationship represented by the expression below:

$$D \leq 60t.$$

4. The method of manufacturing a press-formed product according to claim 1, wherein one of the first and second heated workpieces overlapping in the direction normal to the sheet surface and being transported by the transportation apparatus has a larger sheet thickness and a larger area than the other.

5. The method of manufacturing a press-formed product according to claim 1, wherein, during the transportation step, the first heated workpiece with the lower surface supported, at both ends, by the claws of the pair of first arms and the second heated workpiece with the lower surface supported, at both ends, by the claws of the pair of second arms are transported while being covered with a side shield from a front as determined along a direction of transportation.

6. The method of manufacturing a press-formed product according to claim 5, wherein the side shield has an inclined surface inclined so as to be located closer to the first and second heated workpieces going from a center toward an end.

7. The method of manufacturing a press-formed product according to claim 5, wherein at least one of the first and second heated workpieces has a long-length direction and a short-length direction while being transported by the transportation apparatus, and, during the transportation step, the side shield covers the first and second heated workpieces along the long-length direction.

8. The method of manufacturing a press-formed product according to claim 1, wherein, during the transportation step, the first heated workpiece with the lower surface supported, at both ends, by the claws of the pair of first arms and the second heated workpiece with the lower surface supported, at both ends, by the claws of the pair of second arms are transported while being covered with an upper shield from above.

9. The method of manufacturing a press-formed product according to claim 1, wherein each of the first and second heated workpieces is a differential-thickness sheet with a large-thickness portion and a small-thickness portion, wherein, during the transportation step, the large-thickness portion of the first heated workpiece with the lower surface supported, at both ends, by the claws of the pair of first arms and the small-thickness portion of the second heated workpiece with the lower surface supported, at both ends, by the claws of the pair of second arms are transported while overlapping in the direction normal to the sheet surface.

10. The method of manufacturing a press-formed product according to claim 1, wherein, during the heating step, the heating device heats the workpieces while the first workpiece being heated is located above a sheet-shaped heat storage member and overlaps the heat storage member in the direction normal to the sheet surface of the first heated workpiece and the second workpiece being heated is located above the heat storage member and overlaps the heat storage member in a direction normal to a sheet surface of the second heated workpiece, and the transportation step includes a sub-step in which the heat storage member and the first and second heated workpieces located above the heat storage member are transported altogether from the heating device to a lifting location for the transportation apparatus.

11. The method of manufacturing a press-formed product according to claim 1, wherein:

during the heating step, the first and second workpieces are heated by the heating device while the first workpiece being heated is placed on a first group of at least three struts extending upwardly from a tray body having an empty space extending therethrough in a top-bottom direction when viewed from above, and the second workpiece being heated is placed on a second group of at least three struts extending upwardly from the tray body and positioned above the first workpiece being heated to overlap the first workpiece being heated in the direction normal to the sheet surface of the first workpiece being heated, and the transportation step includes a sub-step in which the first and second heated workpieces, together with the tray body, are transported from the heating device to a lifting location for the transportation apparatus while the first heated workpiece is placed on the first group of struts, the second heated workpieces is placed on the second group of struts and positioned above the first heated workpiece to overlap the first heated workpiece in the direction normal to the sheet surface of the first heated workpiece.

* * * * *